US011865562B2

(12) United States Patent
Moore

(10) Patent No.: US 11,865,562 B2
(45) Date of Patent: Jan. 9, 2024

(54) FOLDING WAND WITH FLUID CONDUIT PASSING THROUGH AXIS OF ROTATION

(71) Applicant: GOJO Industries, Inc., Akron, OH (US)

(72) Inventor: Mark Moore, Aurora, OH (US)

(73) Assignee: GOJO INDUSTRIES, INC., Akron, OH (US)

( * ) Notice: Subject to any disclaimer, the term of this patent is extended or adjusted under 35 U.S.C. 154(b) by 98 days.

(21) Appl. No.: 17/396,163

(22) Filed: Aug. 6, 2021

(65) Prior Publication Data

US 2022/0040720 A1 Feb. 10, 2022

Related U.S. Application Data

(60) Provisional application No. 63/063,182, filed on Aug. 7, 2020.

(51) Int. Cl.
*B05B 15/652* (2018.01)
*B05B 15/63* (2018.01)
*B05B 9/04* (2006.01)

(52) U.S. Cl.
CPC .......... *B05B 15/652* (2018.02); *B05B 9/0403* (2013.01); *B05B 15/63* (2018.02)

(58) Field of Classification Search
CPC ...... B05B 15/562; B05B 15/63; B05B 9/0403
USPC ............. 239/152, 154, 332, 507, 525, 581.1
See application file for complete search history.

(56) References Cited

U.S. PATENT DOCUMENTS 3,893,630 A 7/1975 Bochmann et al.
3,901,449 A 8/1975 Bochmann
4,352,494 A 10/1982 Wells
5,097,540 A 3/1992 Lovitt
5,251,820 A 10/1993 Ho
5,330,106 A 7/1994 Braun, Jr.
5,864,895 A 2/1999 Ota et al.
6,712,292 B1 3/2004 Gosis et al.
6,976,644 B2 12/2005 Troudt
7,140,561 B2 11/2006 Heren et al.
7,337,989 B1 3/2008 Penner et al.
(Continued)

FOREIGN PATENT DOCUMENTS

CN 2709812 Y 7/2005
DE 19900138 A1 8/1999
(Continued)

OTHER PUBLICATIONS

"Brief Introduction to Hand-Held Battery Operated Sprayer with Rotatable Spray Lance", Hangzhou Weirran Machinery Co., LTD., 2019.

(Continued)

*Primary Examiner* — Steven J Ganey

(74) *Attorney, Agent, or Firm* — COOPER LEGAL GROUP LLC

(57) ABSTRACT

An applicator for dispensing a fluid includes a housing and a pump disposed within the housing. The applicator also includes a wand rotatably coupled to the housing. The applicator further includes a conduit that extends between the pump and the wand to deliver the fluid from the pump to the wand. The wand comprises a curved portion for receiving the conduit. The conduit, when disposed in the curved portion, intersects an axis about which the wand rotates.

20 Claims, 23 Drawing Sheets

(56) References Cited

U.S. PATENT DOCUMENTS

| | | | |
|---|---|---|---|
| 7,748,977 | B2 | 7/2010 | Mochizuki et al. |
| 7,837,132 | B2 | 11/2010 | Mazooji et al. |
| D670,982 | S | 11/2012 | Goodwin et al. |
| 8,469,242 | B2 | 6/2013 | Kolon et al. |
| 8,550,378 | B2 | 10/2013 | Mazooji et al. |
| 8,807,455 | B2 | 8/2014 | Havlovitz et al. |
| D713,931 | S | 9/2014 | Dobias et al. |
| 8,950,693 | B2 | 2/2015 | Hsieh |
| D736,577 | S | 8/2015 | Goodwin et al. |
| D769,412 | S | 10/2016 | Henshaw et al. |
| 9,497,953 | B2 | 11/2016 | Mitchell et al. |
| 9,724,708 | B2 | 8/2017 | Helmsderfer et al. |
| D797,529 | S | 9/2017 | Goodwin et al. |
| 10,022,742 | B2 | 7/2018 | Goodwin et al. |
| 10,213,799 | B1 | 2/2019 | Roczey |
| D852,593 | S | 7/2019 | Goodwin et al. |
| 10,493,482 | B2 | 12/2019 | Su |
| 10,591,158 | B2 | 3/2020 | VanCleave, III et al. |
| D921,892 | S | 6/2021 | Milella, Jr. et al. |
| D925,735 | S | 7/2021 | Bernardoni et al. |
| D933,820 | S | 10/2021 | Ota |
| 2004/0050959 | A1 | 3/2004 | Mazooji et al. |
| 2006/0013709 | A1 | 1/2006 | Hudson et al. |
| 2012/0223160 | A1* | 9/2012 | Goodwin .............. B05B 15/652 239/525 |
| 2013/0193232 | A1 | 8/2013 | Dobias et al. |
| 2015/0129682 | A1* | 5/2015 | Mitchell ............. A01M 7/0046 239/154 |
| 2019/0009296 | A1 | 1/2019 | Goodwin et al. |
| 2019/0336998 | A1 | 11/2019 | Falcon |
| 2021/0129164 | A1 | 5/2021 | Jia et al. |

FOREIGN PATENT DOCUMENTS

| | | | |
|---|---|---|---|
| JP | H10 296146 | A | 11/1998 |
| JP | 2005 066497 | A | 3/2005 |
| JP | 2005230595 | A | 9/2005 |
| WO | 2018112054 | A1 | 6/2018 |

OTHER PUBLICATIONS

International Search Report and Written Opinion, corresponding to International Application No. PCT/US2021/044991 dated Nov. 23, 2021, 19 pages.

* cited by examiner

FOLDING WAND WITH FLUID CONDUIT PASSING THROUGH AXIS OF ROTATION

CROSS REFERENCE TO RELATED APPLICATIONS

This application claims priority to U.S. Provisional Patent Application No. 63/063,182, filed on Aug. 7, 2020, entitled "FOLDING WAND WITH FLUID CONDUIT PASSING THROUGH AXIS OF ROTATION," which is hereby incorporated by reference herein.

TECHNICAL FIELD

The present invention relates to an applicator, and more particularly to an applicator with a collapsible wand and a rotatable nozzle for dispensing ready-to-use liquid or fluid products, such as sanitizers or disinfectants.

BACKGROUND

There are many known applicators for dispensing products (e.g., liquids or fluids) to maintain lawns, gardens, plants, sanitizers, or disinfectants. Some applicators include a wand that is rotatably attached to a housing. Often, a conduit is provided between a reservoir and the wand to deliver the product from the reservoir to the wand. Such applicators tend to result in undesired twisting and/or kinking of the conduit when the wand is rotated.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with an aspect, the present disclosure provides an applicator for dispensing a product (e.g., a liquid or fluid). The applicator comprises a housing in which a fluid pump is disposed and a wand that is rotatable relative to the housing. In some embodiments, the housing is sized to be held in the hand of a user. In some embodiments, the housing further comprises an electric motor for driving the fluid pump, a power source, a first conduit for delivering the product to the fluid pump, and a second conduit for delivering the product from the fluid pump to the wand or a nozzle thereof. In some embodiments, at least one of the first conduit or the second conduit is flexible, such as a flexible tube or flexible hose.

In some examples, the second conduit is arranged such that a portion of the second conduit passes into an axis about which the wand is rotated relative to the housing (sometimes referred to herein as a fold axis). When the wand is rotated relative to the housing, the second conduit twists along a central axis of the second conduit. A path that the tube traverses does not lengthen or shorten as a result of the wand being rotated relative to the housing. The second conduit is constrained to jog along the fold axis with one end passing into the wand, and the other end held in the housing.

In accordance with an aspect, an applicator for dispensing a fluid includes a housing and a pump disposed within the housing. The applicator also includes a wand rotatably coupled to the housing. The applicator further includes a conduit that extends between the pump and the wand to deliver the fluid from the pump to the wand. The wand comprises a curved portion for receiving the conduit. The conduit, when disposed in the curved portion, intersects an axis about which the wand rotates.

In accordance with an aspect, an applicator for dispensing a fluid includes a housing. The applicator also includes a pump disposed within the housing. The applicator further includes a wand rotatably coupled to the housing about a rotational axis. The applicator still further includes a conduit that extends along a conduit central axis. The conduit extends between the pump and the wand to deliver the fluid from the pump to the wand. The wand defines a duct for receiving the conduit, and a portion of the conduit central axis is colinear with the rotational axis.

In accordance with an aspect, an applicator for dispensing a fluid includes a housing and a pump disposed within the housing. The applicator also includes a wand rotatably coupled to the housing, the wand defining a duct. The wand includes a curved portion at an end of the wand. The applicator further includes a conduit extending between the pump and the wand to deliver the fluid from the pump to the wand. The conduit includes a first portion disposed in the housing, a second portion disposed in the curved portion, and a third portion disposed in the duct. The wand is rotatable from a first position relative to the housing to a second position relative to the housing. When in the first position, a conduit path of the conduit from the first portion to the third portion has a first length. When in the second position, the conduit path from the first portion to the third portion has a second length, and the first length is equal to the second length.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 1:
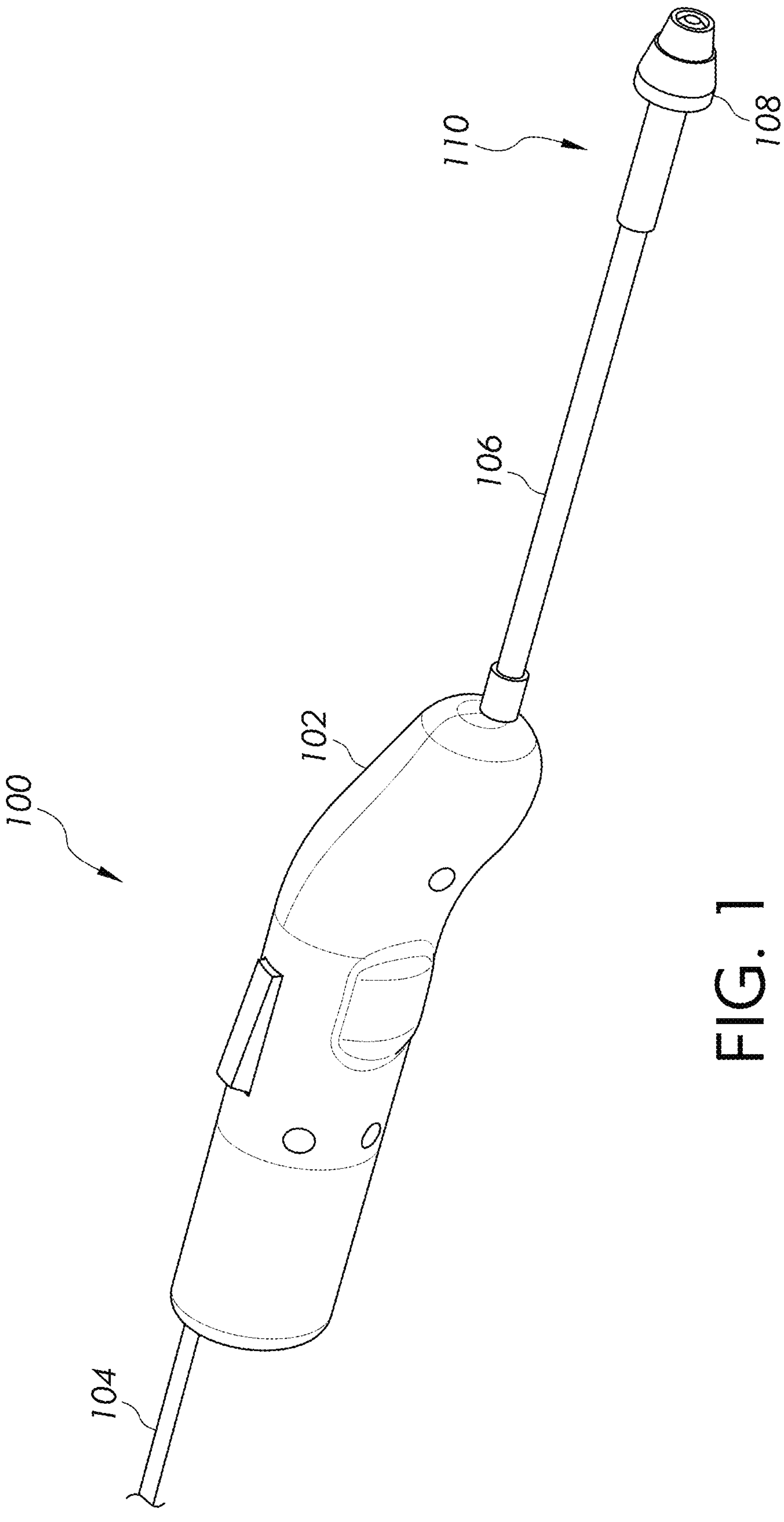
FIG. 1 illustrates an example applicator having a folding or rotatable wand.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

Referring to FIG. 1, in accordance with an aspect, the present disclosure provides an applicator 100 for dispensing a product (e.g., a liquid or fluid). The fluid can include any number of suitable fluids and can include, but is not limited to, surface disinfectant, soap, sanitizer, etc. The applicator 100 includes a housing 102 that is configured to include various structures that will be described below. In some examples, the housing 102 is at least one of sized to be held in the hand of a user (not shown) or ergonomically designed to fit within the hand of the user. Any suitable materials can be used to construct the housing 102 so long as the resulting housing 102 is suited to withstand the rigors of expected use and provide a suitable life cycle for the applicator 100.

The applicator 100 also includes a first conduit 104 configured to deliver the fluid from a reservoir (not shown) to the housing 102. An application of a partial vacuum to the first conduit 104 tends to draw fluid from the reservoir to the housing 102. Any suitable size or type of reservoir can be used with the present disclosure. Examples of reservoirs can include refillable bottles and bulk containers that can be carried with a first hand while the user carries the applicator 100 with a second hand. In some examples, the first conduit 104 is flexible, such as a flexible tube or a flexible hose. In some examples, the housing 102 can be separated from the reservoir such that the only connection between the housing 102 and the reservoir is the first conduit 104. This arrangement can allow the user to freely move the housing 102 relative to the reservoir to apply the fluid to a relatively broad area with little or no movement of the reservoir. It is also contemplated that the housing 102 can be attached to the reservoir such that the housing 102 and the reservoir cannot be moved relative to one another.

Remaining with FIG. 1, the applicator also includes a wand 106 that is rotatable relative to the housing 102. The wand 106 can enable the user to have both a relatively long reach to apply the fluid to a desired application area (e.g., a surface to be disinfected) and enable the user to cover a relatively large area of application in a shorter time compared to applicators that may have nozzles relatively close to the user's hand.

The applicator 100 also includes a nozzle 108. The nozzle 108 can be attached to a distal end 110 of the wand 106 by any suitable means (e.g., a threaded connection). The nozzle 108 can be used to limit the amount of fluid that can be dispensed within a given time by controlling the area of an orifice defined by the nozzle 108. The orifice of the nozzle 108 can also define a fluid spray pattern as the fluid passes through the orifice and leaves the nozzle 108. In some examples, the orifice size and shape of the nozzle 108 cannot be altered as desired, however, a selection of multiple nozzles 108 can provide a range of fluid application volume per time and spray patterns as so desired. In other examples, the fluid spray pattern and fluid volume application may be specifically mandated such that nozzle 108 selection for particular applications may not be changed by the user.

Figure 2:
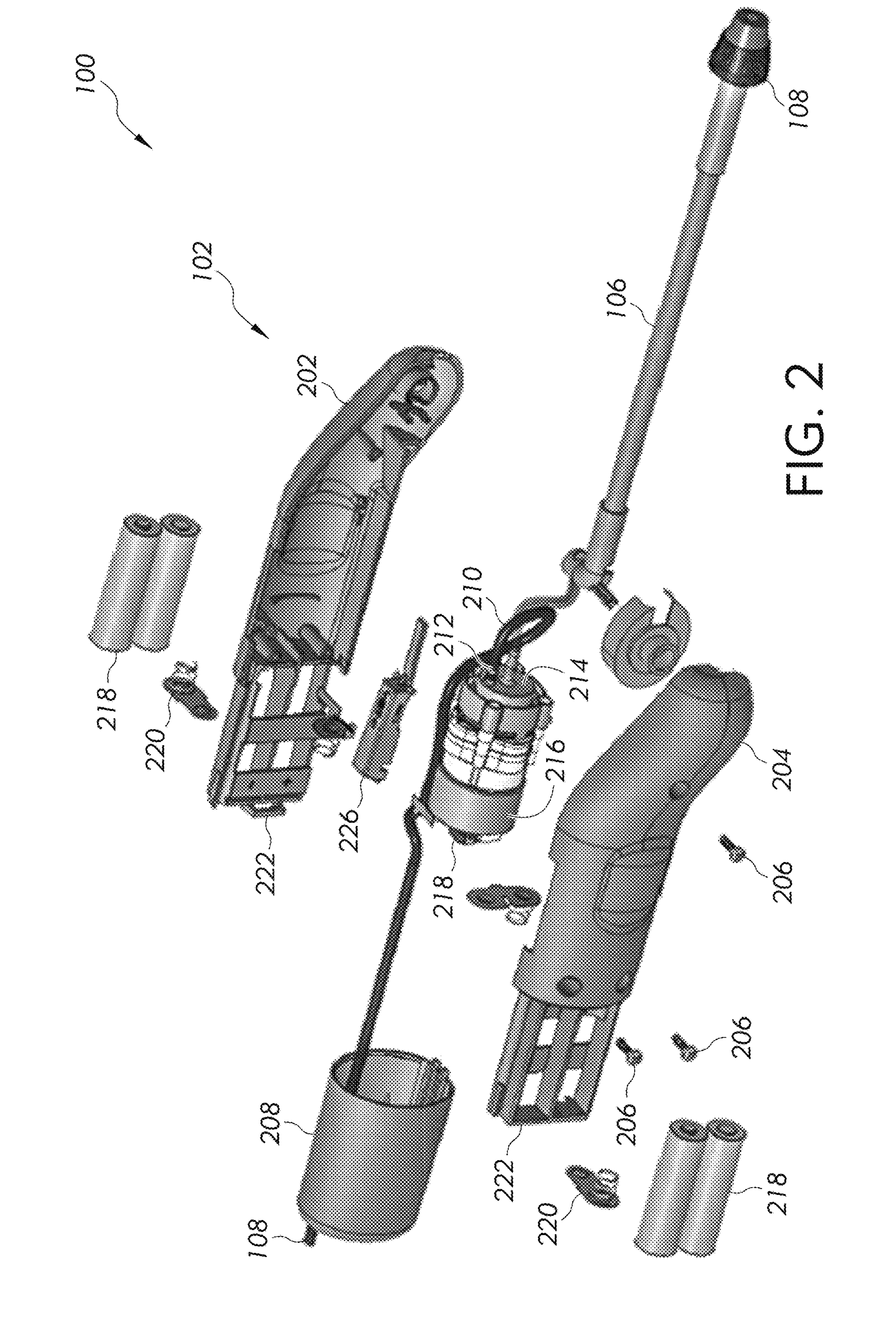
FIG. 2 illustrates an exploded view of the applicator.

Referring to FIG. 2, an exploded view of an example applicator 100 is illustrated. The housing 102 defines a hollow interior 200 that is configured to house various structures that will be described below. In some examples, the housing 102 can be divided into two or more sections that are attached together for ease of manufacturing and assembly. As shown, the housing 102 can include a first portion 202, and a second portion 204 that are shaped to fit the user's hand. The first portion 202 and the second portion 204 can each define approximately one-half of the housing 102. Each of the first portion 202 and the second portion 204 can be hollow so as to form the hollow interior 200. Any suitable attachment methods and structures can be used with the present disclosure to secure the first portion 202 to the second portion 204. Some examples include tab and slot attachments, snap fits, adhesive attachment, or threaded fasteners (e.g., screws 206). After the first portion 202 is attached to the second portion 204, a length of the first portion 202 and the second portion 204 can be placed within a third portion 208 in order to form the complete housing 102. Of course, other combinations and numbers of housing portions can be placed together to form the entire housing 102.

As shown, the first conduit 104 can pass through an aperture in the third portion 208 such that the fluid can be urged from the reservoir (not shown) to the hollow interior 200. An end 210 of the first conduit 104 can be attached to an inlet 212 of a fluid pump 214 such that the fluid can be urged from the reservoir to the fluid pump 214. Any suitable fluid pump 214 can be used in conjunction with the present disclosure. The fluid pump 214 can be physically connected to and can be driven by an electric motor 216 that is disposed within the hollow interior 200. In turn, the electric motor 216 can be in electrical communication with a power source disposed within the hollow interior 200, such as a battery 218. Other power sources and numbers of power sources are also contemplated, for example, four (4) AA batteries, rechargeable batteries, a rechargeable capacitor, etc. The battery 218 provides electrical power to operate the electric motor 216.

Of course, in the provided example of four (4) AA batteries providing power to the electric motor 216, the housing 102 can also include battery terminals 220, a battery frame 222, and a circuit path (e.g., wiring 224) to provide an electrical circuit to operate the electric motor 216. In some examples, the battery frame 222 can be a portion of at least one of the first portion 202, the second portion 204, or the third portion 208.

The electrical circuit including the electric motor 216 and the battery 218 can include a switch 226 or a trigger such that selective user operation of the switch 226 can selectively operate the applicator 100. For example, user operation of the switch 226 can close the electrical circuit to power the electric motor 216 to operate the fluid pump 214 and move the fluid from the reservoir to the applicator 100 and through the nozzle 108 to dispense the fluid as desired. User release of the switch 226 will interrupt the electrical circuit and stop the dispensation of the fluid until the next desired dispensation.

Figure 3:
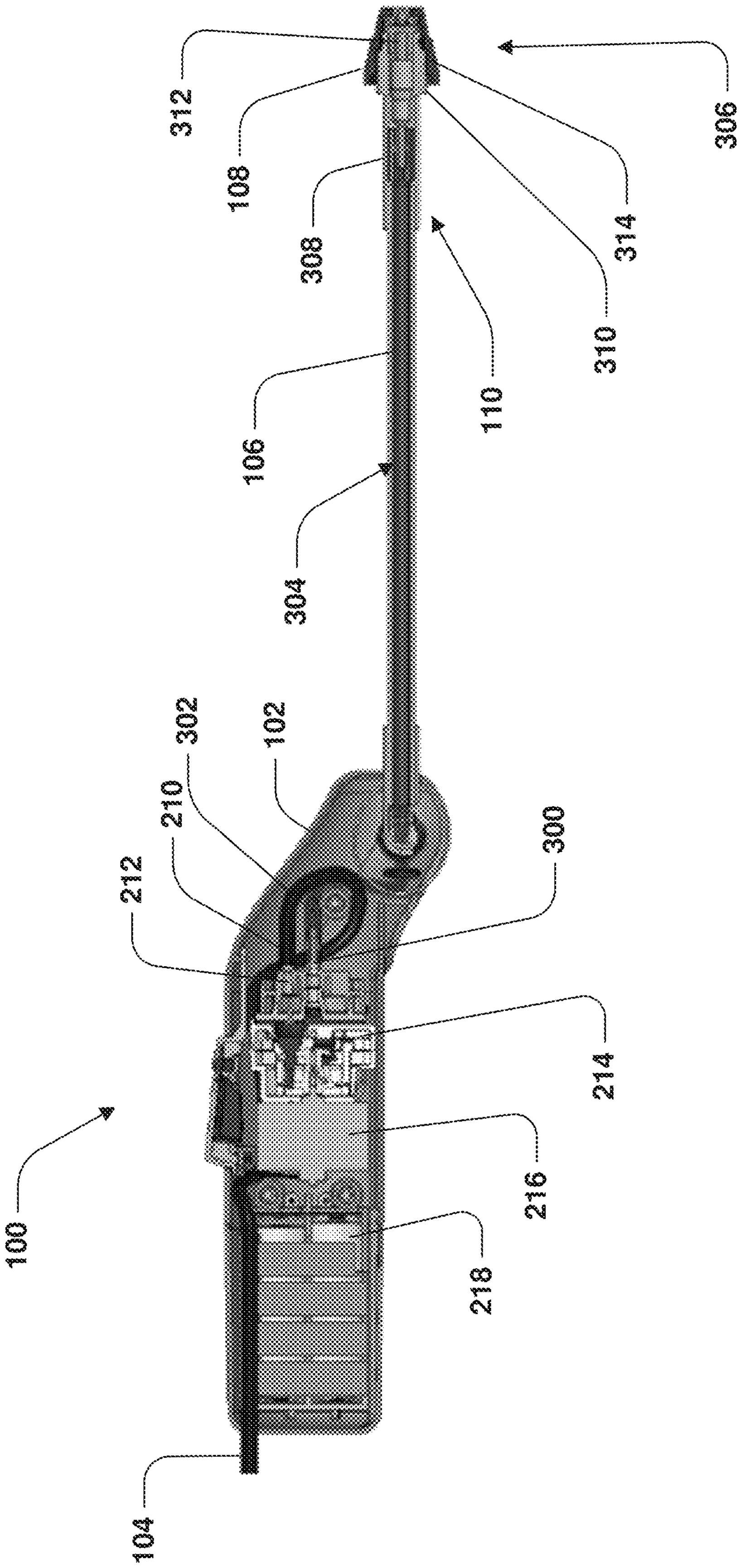
FIG. 3 is a cross-sectional view of the applicator.

Referring to FIG. 3, a cross-section view of the applicator 100 is illustrated. In this view the relationships between the battery 218, the electric motor 216, the fluid pump 214, and the first conduit 104 in the assembled state of the applicator 100 is shown. An outlet 300 of the fluid pump 214 is attached to a second conduit 302 configured to deliver the fluid from the outlet 300 of the fluid pump 214 to the wand 106 and the nozzle 108. In some examples, the second conduit 302 is flexible, such as a flexible tube or a flexible hose. It is to be understood that the fluid can be urged from the reservoir by using a partial vacuum applied to the first conduit 104 where the fluid then enters the inlet 212 of the fluid pump 214. The fluid pump applies a pressure to the fluid to urge the fluid through the outlet 300 of the fluid pump 214 and into the second conduit 302. The fluid is then urged through the second conduit 302, to the nozzle 108 where it is dispensed as desired.

As shown in FIG. 3, the wand 106 defines a hollow interior or duct 304 through which the second conduit 302 passes. It is contemplated that the second conduit 302 could end at a point within the wand 106 closer to the housing 102 than the nozzle 108. In such examples, the second conduit 302 can extend between the fluid pump 214 and the wand 106. However, as shown, the second conduit 302 can be attached to the nozzle 108 or a nozzle assembly 306 such that the second conduit 302 extends between the fluid pump 214 and the nozzle 108.

Additionally, the attachment of the nozzle 108 to the distal end 110 of the wand 106 can include the noted nozzle assembly 306. In the shown example, the nozzle assembly 306 includes a sheath 308 that surrounds the distal end 110 of the wand 106. The sheath 308 can also surround a portion of an insert 310. The insert 310 defines a central aperture that can have multiple diameters to promote desired flow characteristics of the fluid. The insert 310 can include an inlet that is configured to be placed within an end of the second conduit 302. An interior surface of the second conduit 302 seals around the inlet such that a fluid-tight seal exists between the second conduit 302 and the insert 310. Additionally, the second conduit 302 and the insert 310 are in fluid communication to deliver the fluid from the second conduit 302 to the nozzle assembly 306.

The insert 310 can also include a second insert 312 such that the fluid passes through the second insert 312 prior to flowing through the nozzle 108. As shown, the nozzle 108 can be attached to the insert 310 using a threaded connection at 314. Again, any suitable connection between the nozzle 108 and the insert 310 or any other portion of the nozzle assembly 306 can be used with the present disclosure. Additionally, in some examples, the nozzle 108 can be directly attached to the distal end 110 of the wand 106.

Figure 4:
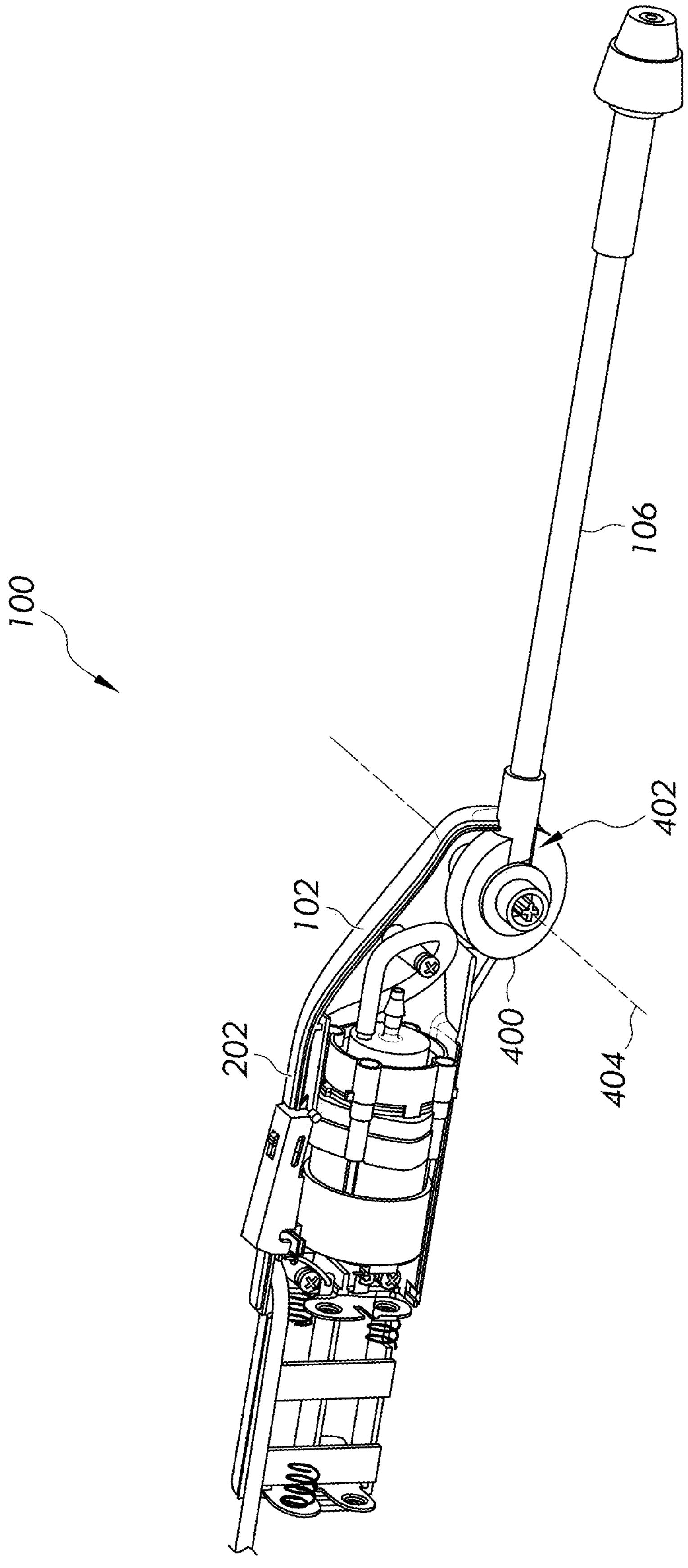
FIG. 4 is a partial cross-sectional view of the applicator.

Referring to FIG. 4, a partial cross-sectional view of the applicator 100 is illustrated. The applicator 100 can include a hinge structure 400 that facilitates a rotatable connection between the wand 106 and the housing 102. In other words, the wand is rotatably coupled to the housing 102. The hinge structure 400 can be generally a circular cylinder or an ovoid cylinder that defines a notch 402 into which the wand 106 passes. The hinge structure 400 is configured to cooperate with corresponding structure on at least one of the first portion 202 or the second portion 204 (not shown in FIG. 4) such that the hinge structure 400, can rotate about an axis 404 which may also be termed a fold axis.

Figure 5:
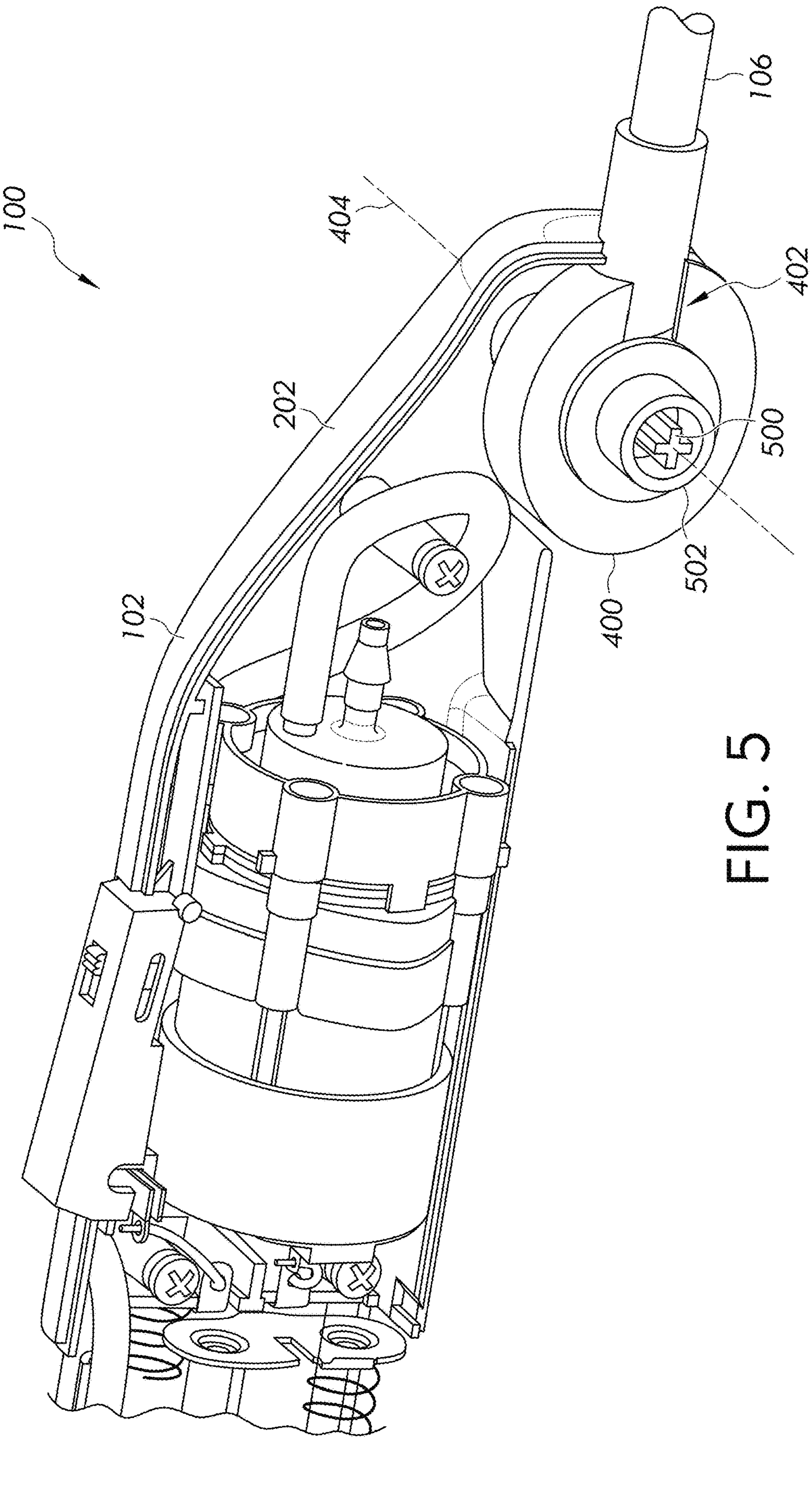
FIG. 5 is a partial cross-sectional detail view of the applicator.

Referring to FIG. 5, a partial cross-sectional detail view of the applicator 100 is illustrated. While any suitable cooperating structures that can be used with the present disclosure to help ensure the hinge structure 400 rotates smoothly about the fold axis 404, one particular example is shown. Here, the wand 106 can include a post 500 that passes through an annular portion 502 of the hinge structure 400. the annular portion 502 can cooperate with a cylindrical structure (not shown) that is a portion of the housing 102. In this way, the hinge structure 400 has a structurally defined point provided by the housing 102 in order to rotate about the fold axis 404. In turn, the wand 106 rotates about the fold axis 404 when acted upon by the user.

Figure 6:
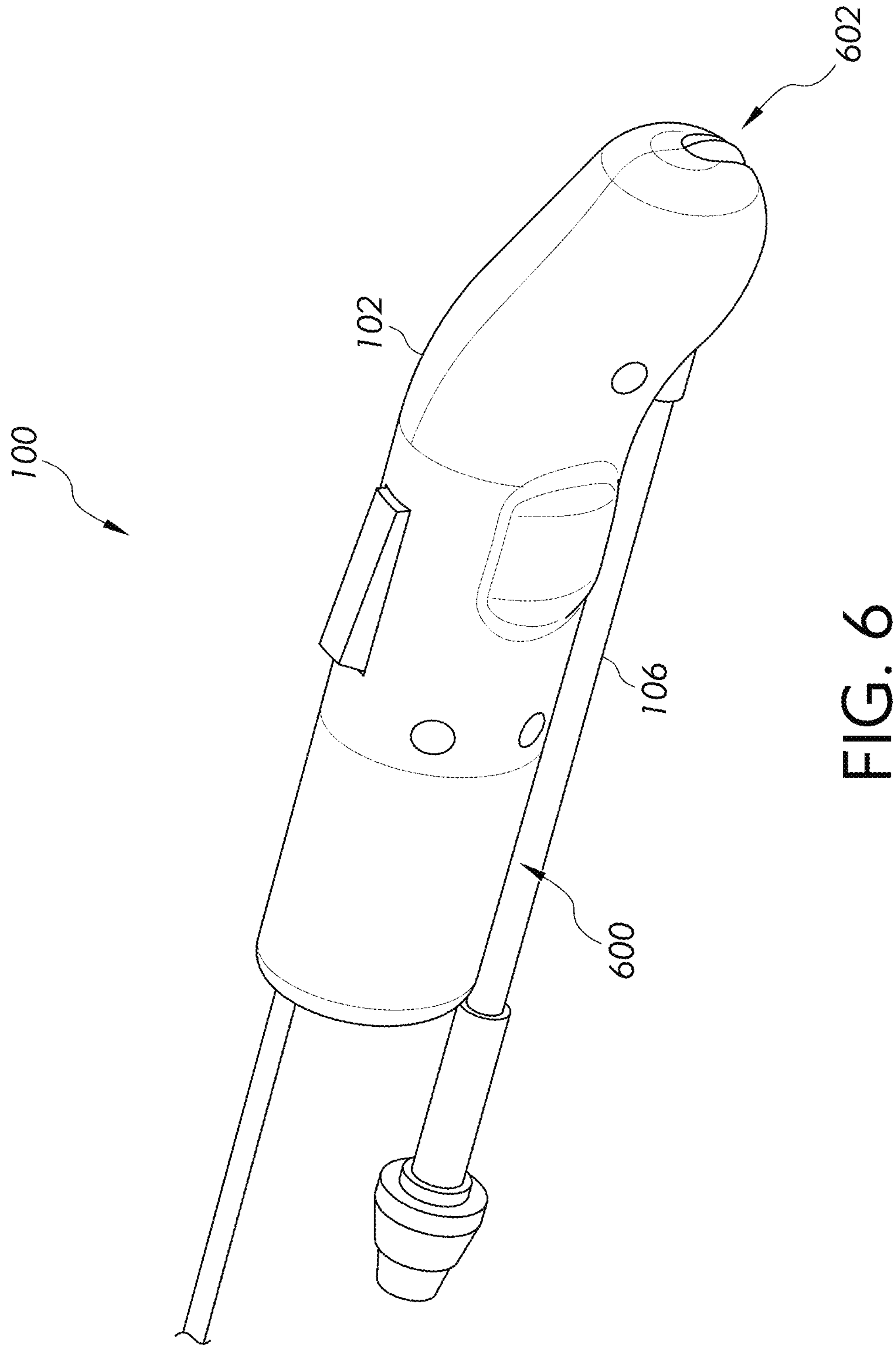
FIG. 6 shows the applicator with the wand located in a first position.

Referring to FIG. 6, the applicator 100 is illustrated with the wand 106 located in a first position. FIGS. 1-5 each show the wand 106 in a second position which is extended away from the housing 102. As shown, the first position can include the wand 106 located essentially parallel to a bottom surface 600 of the applicator 100. FIG. 6 also shows the housing 102 defining a slot 602 through which the wand 106 is able to rotate. When the user desires to use the applicator 100, the user places a force on the wand to urge the wand to rotate about the fold axis 404 (not shown in FIG. 6) to extend away from the housing 102. In some examples, the wand 106 can rotate about 200° from the first position to the second position. In some examples, the wand 106 can rotate about 190° from the first position to the second position. In still further examples, the wand 106 can rotate about 180° from the first position to the second position. Other rotational ranges are also contemplated.

Figure 7:
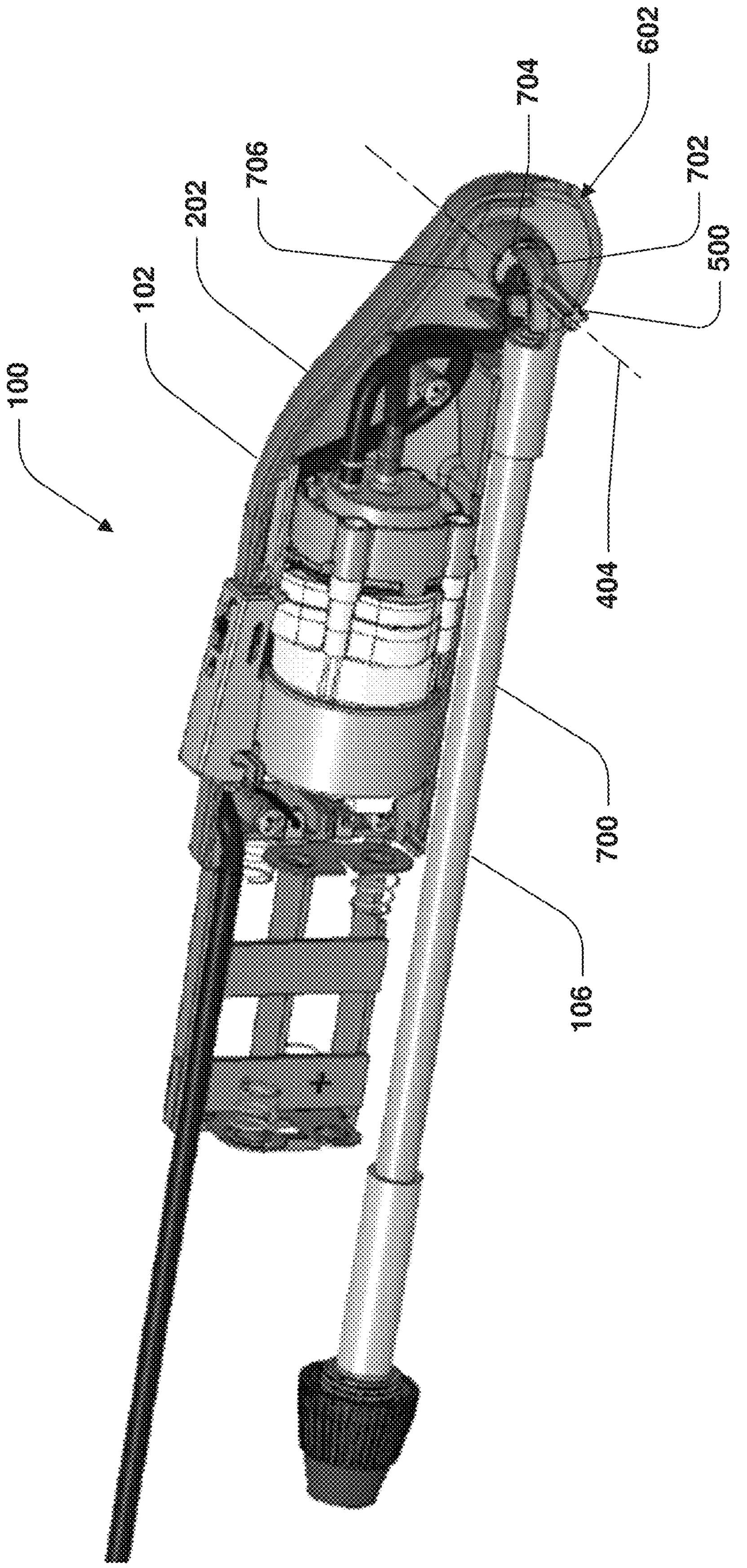
FIG. 7 shows a partial cross-sectional detail of the applicator.

Referring to FIG. 7, a partial cross-sectional detail of the applicator 100 is illustrated. The wand 106 includes a straight portion 700 and a curved portion 702 disposed between the straight portion 700 and the housing 102. In some examples, a protruding member 704 (also shown in detail in FIG. 8) extends out of the curved portion 702 and is received within an aperture or cooperating structure 706 of the housing 102. The protruding member 704 can be in rotating contact with the cooperating structure 706 when the wand 106 is rotated. In some examples, the fold axis 404 extends parallel to the direction in which the protruding member 704 extends from the curved portion 702. Additionally, the fold axis 404 can also extend from the curved portion 702 parallel to the direction in which the post 500 extends from the curved portion 702.

Figure 8:
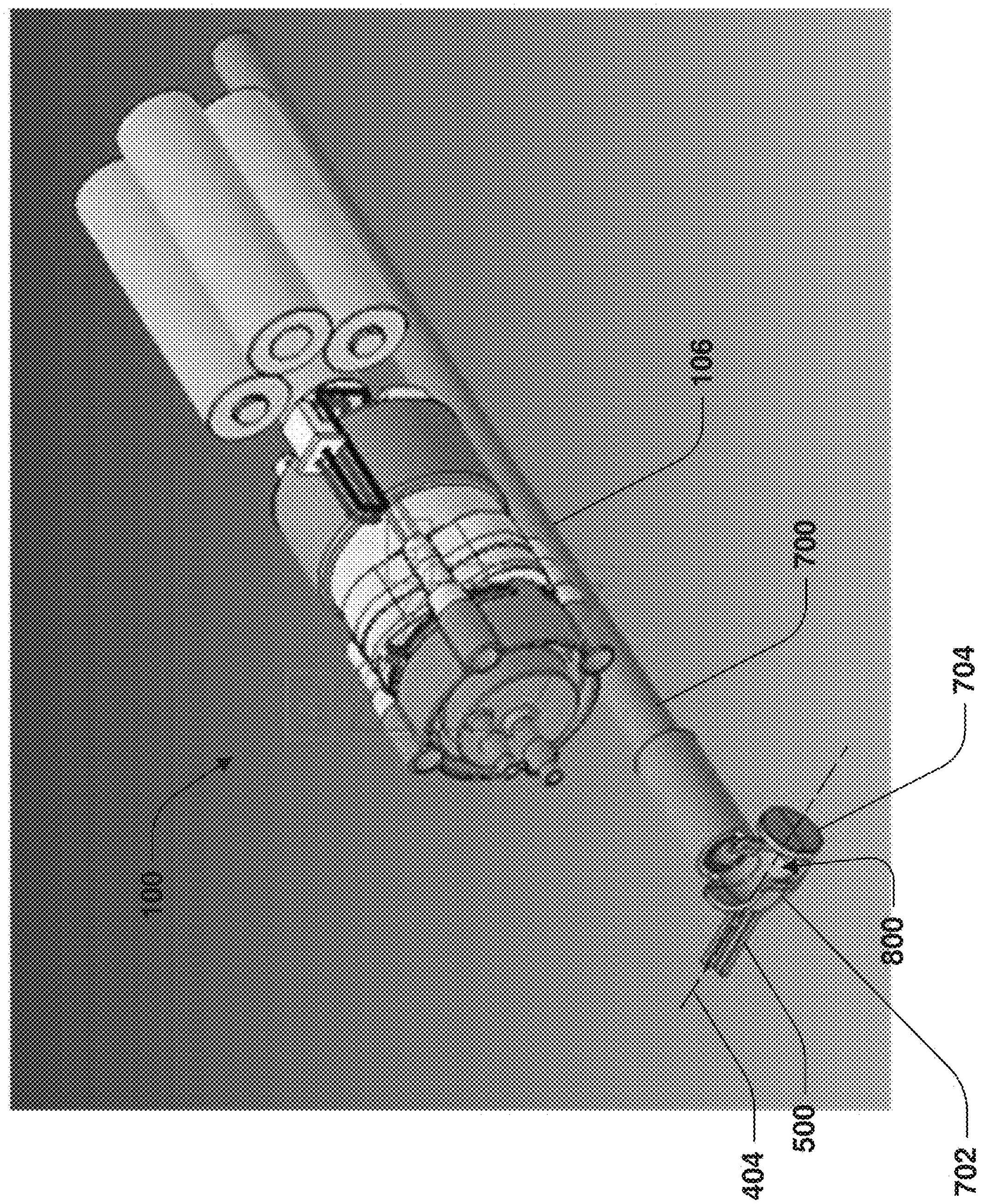
FIG. 8 shows a detail view of some components of the applicator.

Referring to FIG. 8, a detail view of some components of the applicator 100 are illustrated. The wand 106 is again shown in the first position and the curved portion 702 is shown in greater detail. The protruding member 704 is also shown in greater detail. The fold axis 404 is shown passing through the center of the post 500 and the center of the protruding member 704. The curved portion 702 includes a linear portion 800 having a center line that is colinear with the fold axis 404. The linear portion is generally perpendicular to the straight portion 700 of the wand 106.

Figure 9:
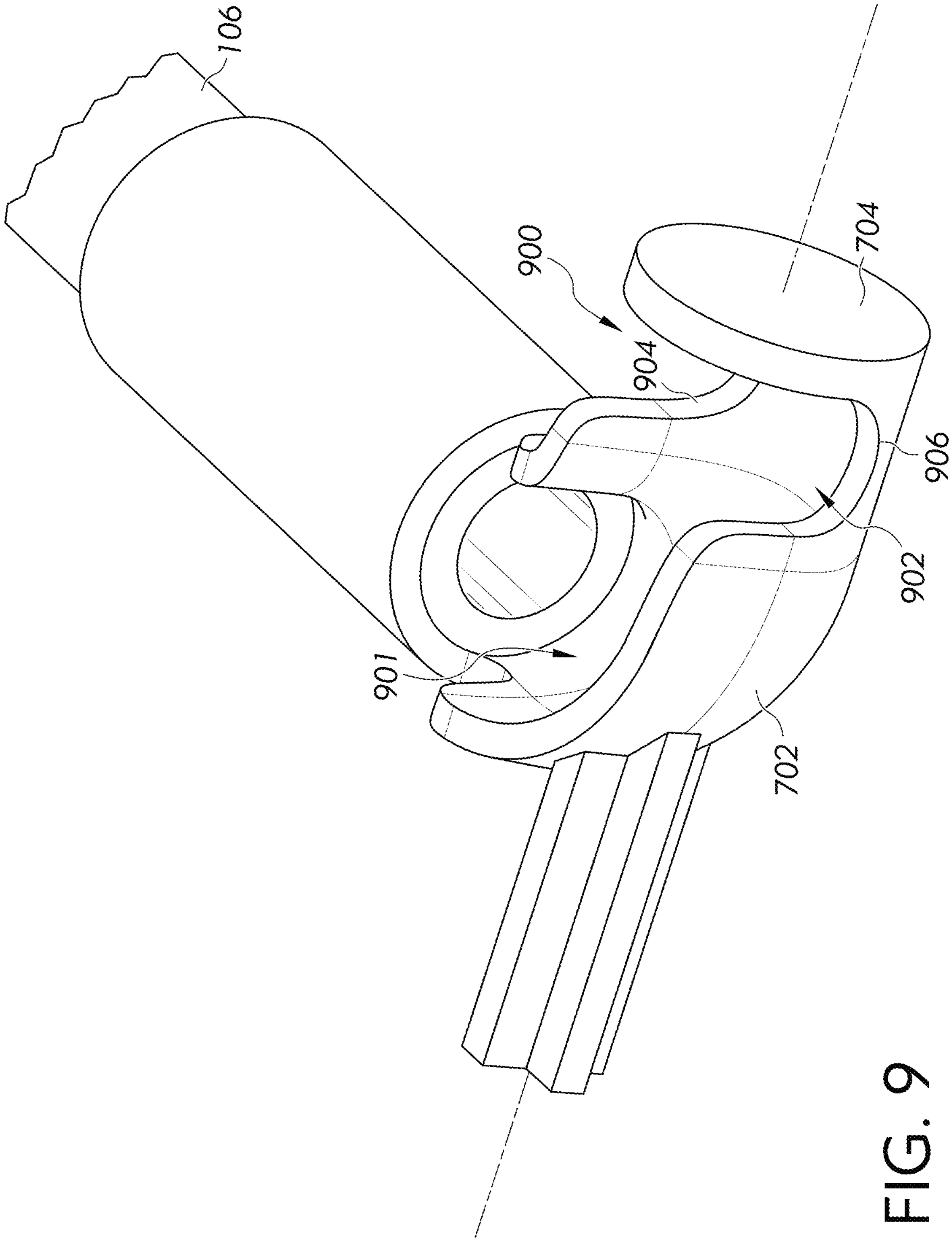
FIG. 9 shows a detail view of a curved portion of a wand of the applicator.

Referring to FIG. 9, a detail view of the curved portion 702 of the wand 106 of the applicator 100 is illustrated. In some examples, the curved portion 702 defines a substantially u-shaped or c-shaped tube channel 901 (which bends approximately 90 degrees) into which the second conduit 302 is seated to fluidly connect to the straight portion 700 of the wand 106. In some examples, the curved portion 702 further defines a first u-shaped or c-shaped channel 900, or first channel 900, into which the second conduit 302 is received into the curved portion 702, the other end of the second conduit 302 attached to the fluid pump 214. In some examples, the first channel 900 extends through a first sidewall 904 of the curved portion 702. In some examples, a second channel 902 extends through a second sidewall 906 of the curved portion 702. In some examples, the second sidewall 906 is diametrically opposite the first sidewall 904 and the first channel 900 and the second channel 902 are colinear while being perpendicular to the tube channel 901.

When the wand 106 is rotated to the first position relative to the housing 102 (e.g., in which the wand 106 and the housing 102 are folded together), the second conduit 302 may pass through a portion of the first u-shaped or c-shaped channel 900 extending through the first sidewall 904, and when the wand 106 is rotated to a second position relative to the housing 102 (e.g., in which the wand 106 extends away from the housing 102), the second conduit 302 may pass through a portion of the second u-shaped or c-shaped channel 902 extending through the second sidewall 906. In other words, the curved portion 702 rotates about the second conduit 302 at a portion of the second conduit 302 where the second conduit passes through the second u-shaped or c-shaped channel 902.

Figure 10:
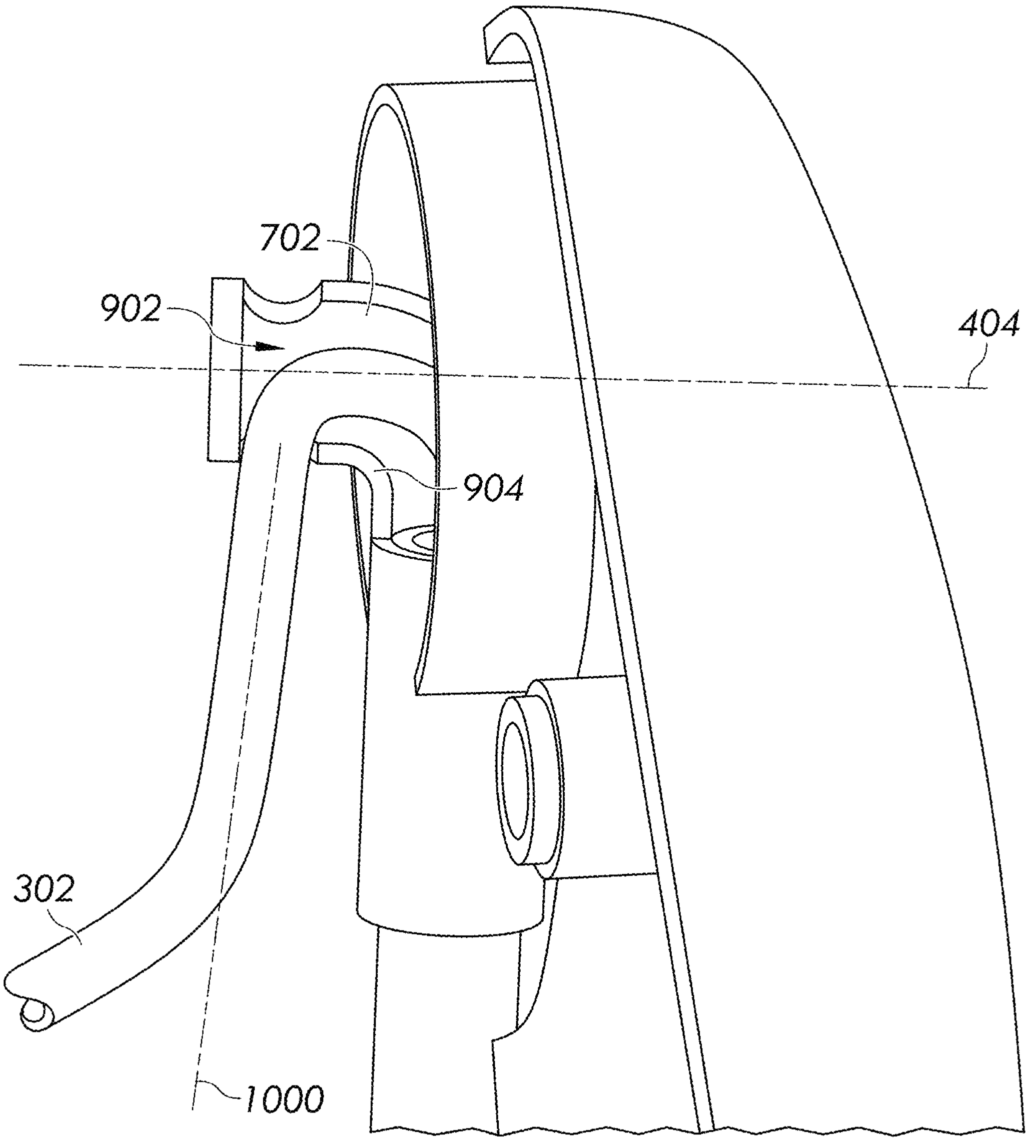
FIG. 10 is a detail view of the curved portion and a second conduit when the wand is in a first position.

Referring to FIG. 10, a detail view of the curved portion 702 and the second conduit 302 when the wand 106 is in the first position is illustrated. Note that this is a top view of the curved portion 702. Here, the second conduit 302 passes through the first sidewall 904 to pass into the first channel 900 of the curved portion 702. Also note that the second conduit 302 extends along a conduit central axis 1000. Because the second conduit 302 is flexible, the conduit central axis 1000 is not always straight, but remains at the center of the second conduit 302 regardless of the twists and bends that the second conduit 302 undergoes.

Figure 11:
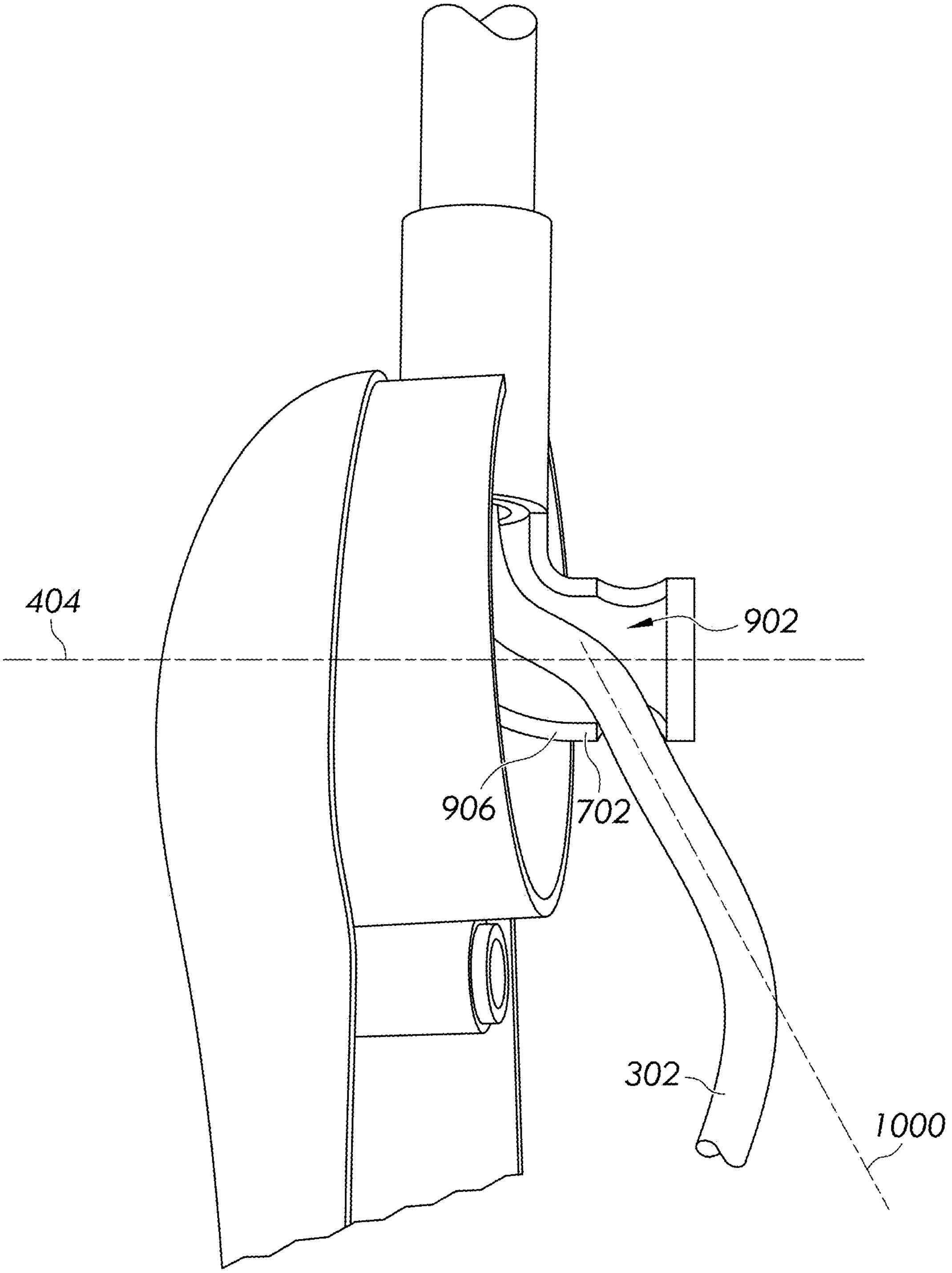
FIG. 11 is a detail view of the curved portion and the second conduit when the wand is in a second position.

Referring to FIG. 11, a detail view of the curved portion 702 and the second conduit 302 when the wand 106 is in the second position is illustrated. Note that this is a bottom view of the curved portion 702, unlike FIG. 10. This difference of views is to illustrate the second conduit 302 passing through the first sidewall 904 versus the second sidewall 906. Here, the second conduit 302 passes through the second sidewall 906 to pass into the second channel 902 of the curved portion 702. As shown, the wand 106 includes the curved portion 702 for receiving the second conduit 302, and the second conduit 302, when disposed in the curved portion 702, intersects the fold axis 404 about which the wand 106 rotates.

Figure 12:
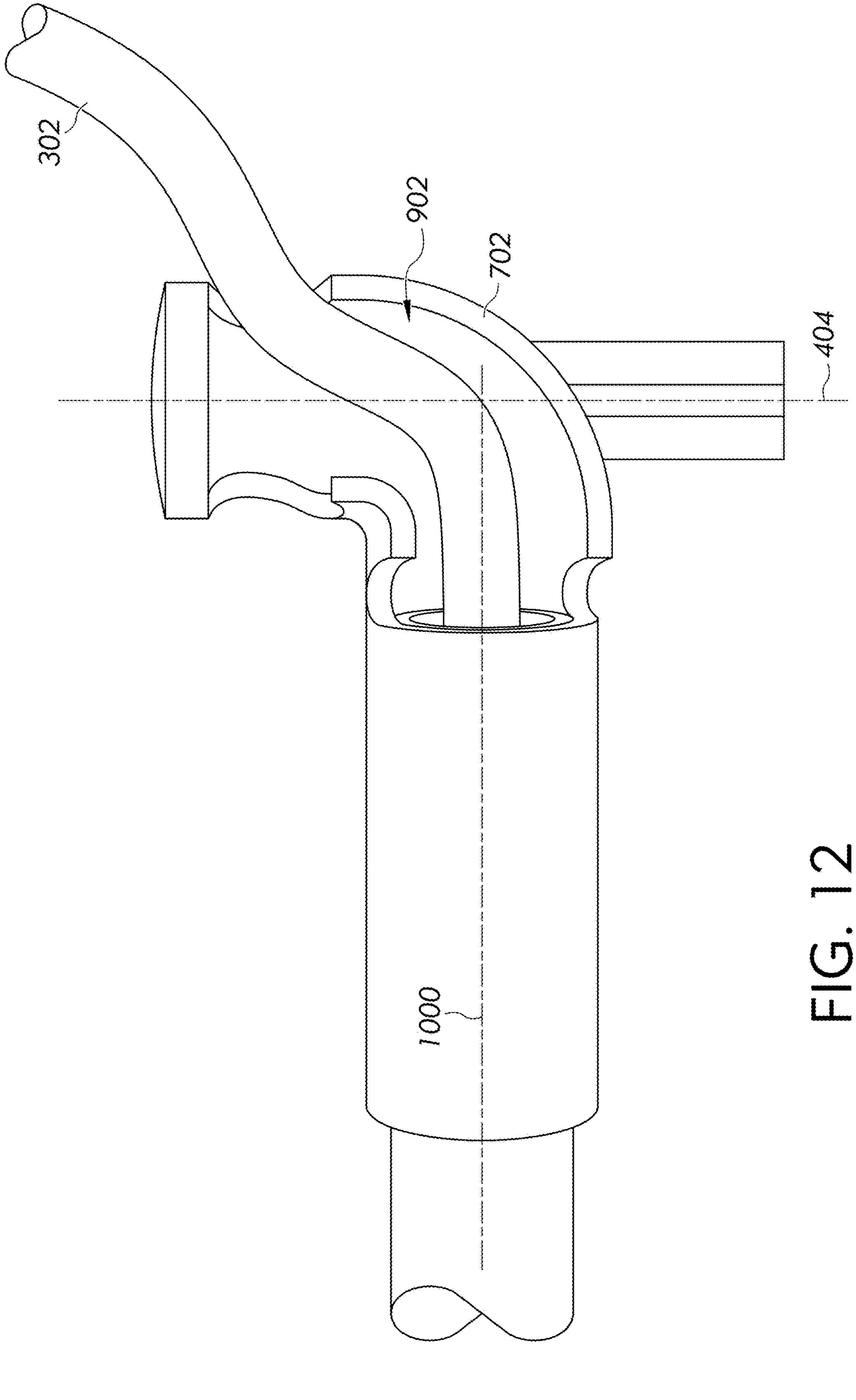
FIG. 12 is a detail view of the second conduit received within the curved portion.

Referring to FIG. 12, a detail view of the second conduit 302 received within the curved portion 702 is illustrated. In some examples, the second conduit 302 is received within the curved portion 702, the conduit central axis 1000 intersects the fold axis 404.

Figure 13:
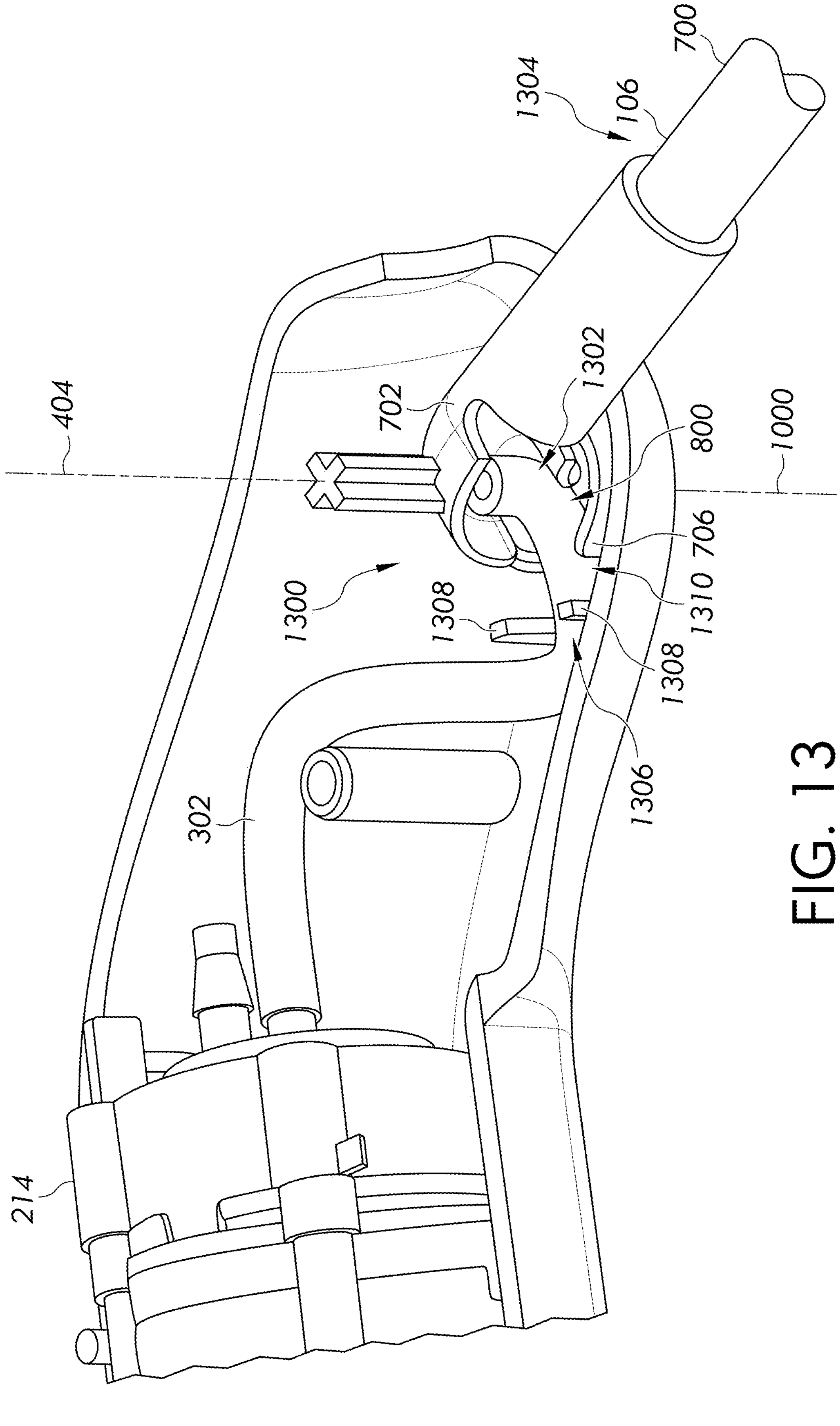
FIG. 13 is a detail view of the second conduit received within the curved portion.

Referring to FIG. 13, a detail view of the second conduit 302 received within the curved portion 702 is illustrated. In this detail view, one can appreciate the orientation of the second conduit 302 extending from the fluid pump 214 and into the wand 106. Note that the portion of the second conduit 302 passing from the curved portion 702 into the straight portion 700 is cut-off in this view for the sake of clarity. In some examples, the second conduit 302 is arranged such that a portion of the second conduit 302 passes into the fold axis 404 about which the wand 106 is rotated relative to the housing 102. In other words, the conduit central axis 1000 is colinear with the fold axis 404. During this situation, when the conduit central axis 1000 is colinear with the fold axis 404, the portion of the second conduit 302 that lies within the linear portion 800 of the curved portion 702 is constrained to twisting about the conduit central axis 1000 when the wand 106 is moved between the first position and the second position.

Also during this situation, when the conduit central axis 1000 is colinear with the fold axis 404 as shown in FIG. 13, a path that the second conduit 302 traverses does not lengthen or shorten as a result of the wand 106 being rotated relative to the housing 102. The second conduit 302 is constrained to twist about the fold axis 404 with one end passing into the wand 106, and the other end held in the housing 102. This differs from known second conduit apparatus where the conduit central axis is not colinear with the fold axis, and the second conduit takes up slack, twists, etc. built into the applicator in order to maintain the connection between the pump and the wand.

Remaining with FIG. 13, the path that the second conduit 302 traverses does not lengthen or shorten as a result of the wand 106 being rotated relative to the housing 102. In order to illustrate this constant path length, a first portion 1300 of the second conduit 302 is disposed in the housing 102. A second portion 1302 of the second conduit 302 is disposed in the curved portion 702 of the wand 106. Finally, a third portion 1304 of the second conduit 302 is disposed in the duct 304 of the wand 106. The second portion 1302 is located between the first portion 1300 and the third portion 1304. In FIG. 13, the third portion 1304 is not shown for clarity of the second portion 1302, however the second conduit 302 extends into the straight portion 700 of the wand 106 from the curved portion 702 of the wand 106.

As previously discussed and shown, the wand 106 is rotatable from a first position relative to the housing 102 to a second position relative to the housing 102 and positions in between the first position and the second position. When in the first position, a conduit path of the conduit from the first portion 1300 to the third portion 1304 has a first length. Additionally, when in the second position, the conduit path from the first portion 1300 to the third portion 1304 has a second length, and the first length is equal to the second length. This is because as the wand 106 is rotated between the first position and the second position, the second conduit 302, in the second portion 1302 location (e.g., within the linear portion 800 of the curved portion 702) rotates about its conduit central axis 1000 colinear with the fold axis 404 rather than the second portion rotates about its conduit central axis 1000 when it is not colinear with the fold axis 404. Previously known apparatus necessarily need to bend, kink, or otherwise take up slack in the conduit in order for the conduit to rotate with its respective wand. This is because the conduit does not pass through the fold axis or is not colinear with the fold axis of the wand.

In order to help maintain the position of the first portion 1300 of the second conduit 302 in a single position, some examples include a first bracket 1306 cooperating with the first portion 1300 of the second conduit 302. In some examples, cooperating with the first portion 1300 means being, at times, in contact with the second conduit 302. In some examples, the first bracket 1306 includes two posts 1308 extending from an interior surface of the housing 102 and the first portion 1300 of the second conduit 302 is located between the two posts 1308. In this way, the first bracket 1306 provides a physical interference to inhibit the first portion 1300 of the second conduit 302 from rotating about the fold axis 404. Even while the first portion 1300 of the second conduit 302 is physically prevented from rotating about the fold axis 404, the second portion 1302 does rotate about the fold axis 404, however this rotation results only in a twisting action upon the second portion 1302 and does not increase or decrease the length of the path of the second conduit 302. As shown, the posts 1308 can be located on either side of the first portion 1300.

In some examples, a second bracket 1310 cooperates with the second conduit 302 to provide a second physical interference spaced a distance from the first bracket 1306 to inhibit the first portion 1300 from rotating about the fold axis 404. In some examples, the second bracket 1310 can be a groove located in the cooperating structure 706 of the housing 102.

Figure 14:
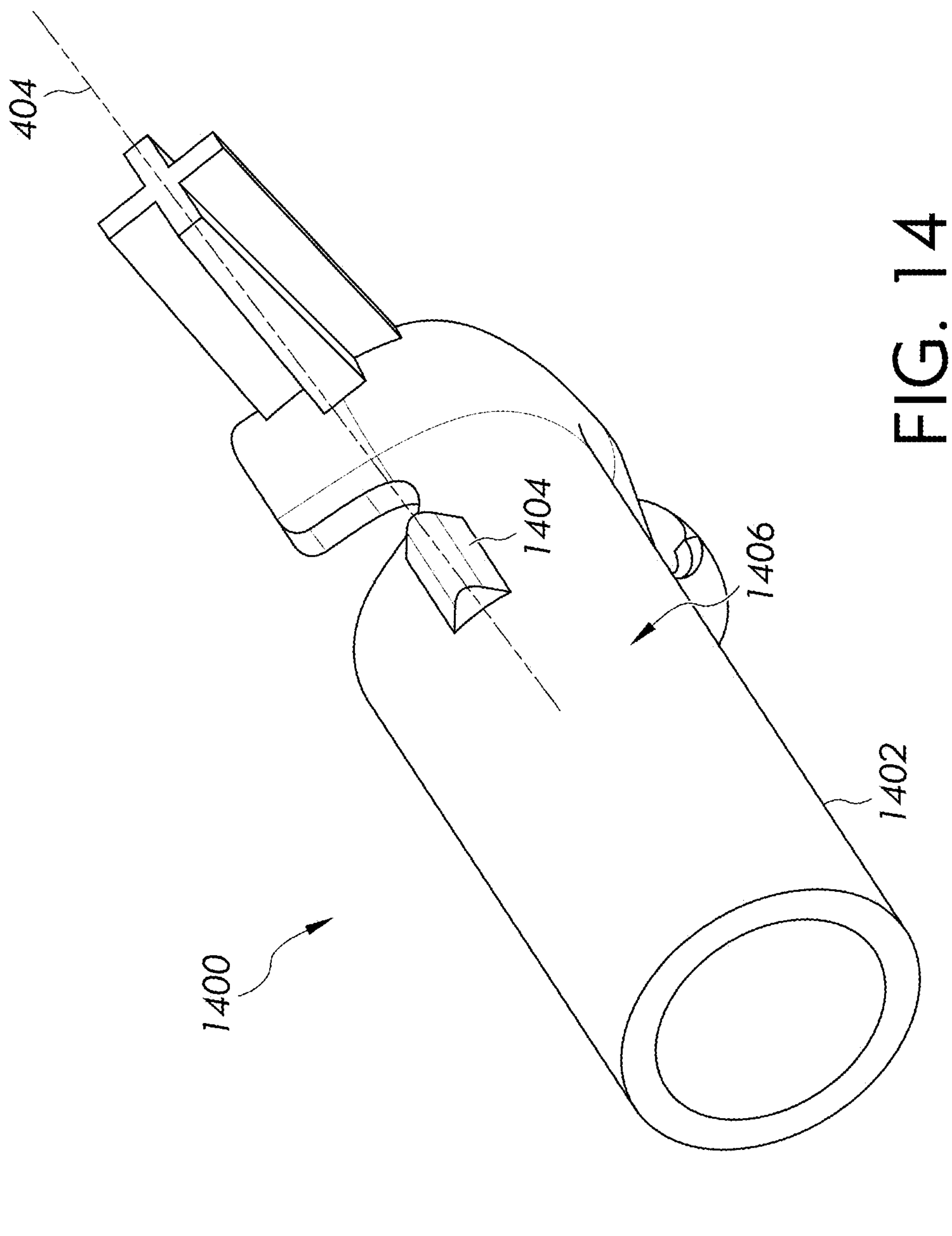
FIG. 14 is a perspective view of a second example curved portion.
Figure 15:
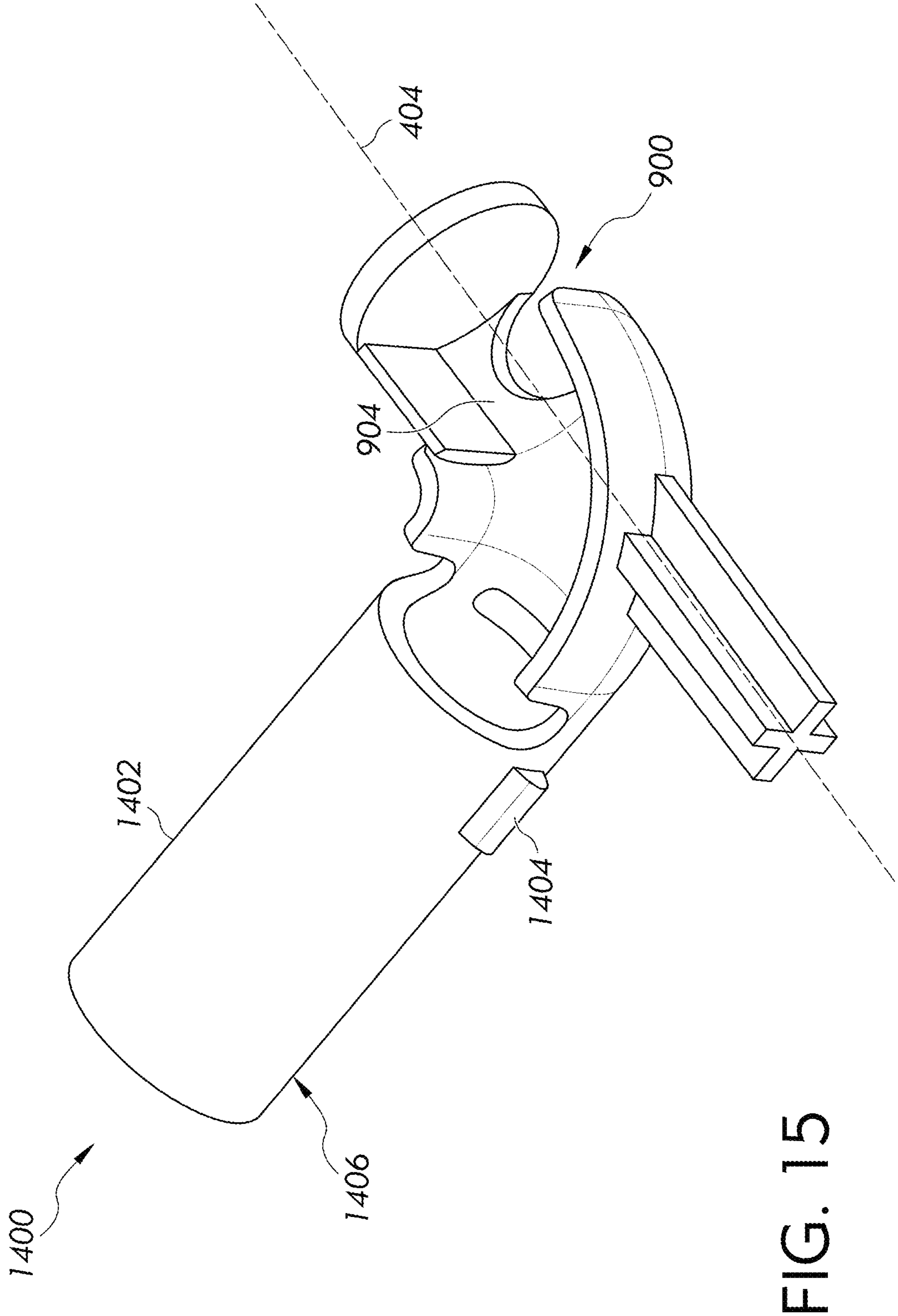
FIG. 15 is a perspective view of the second example curved portion.
Figure 16:
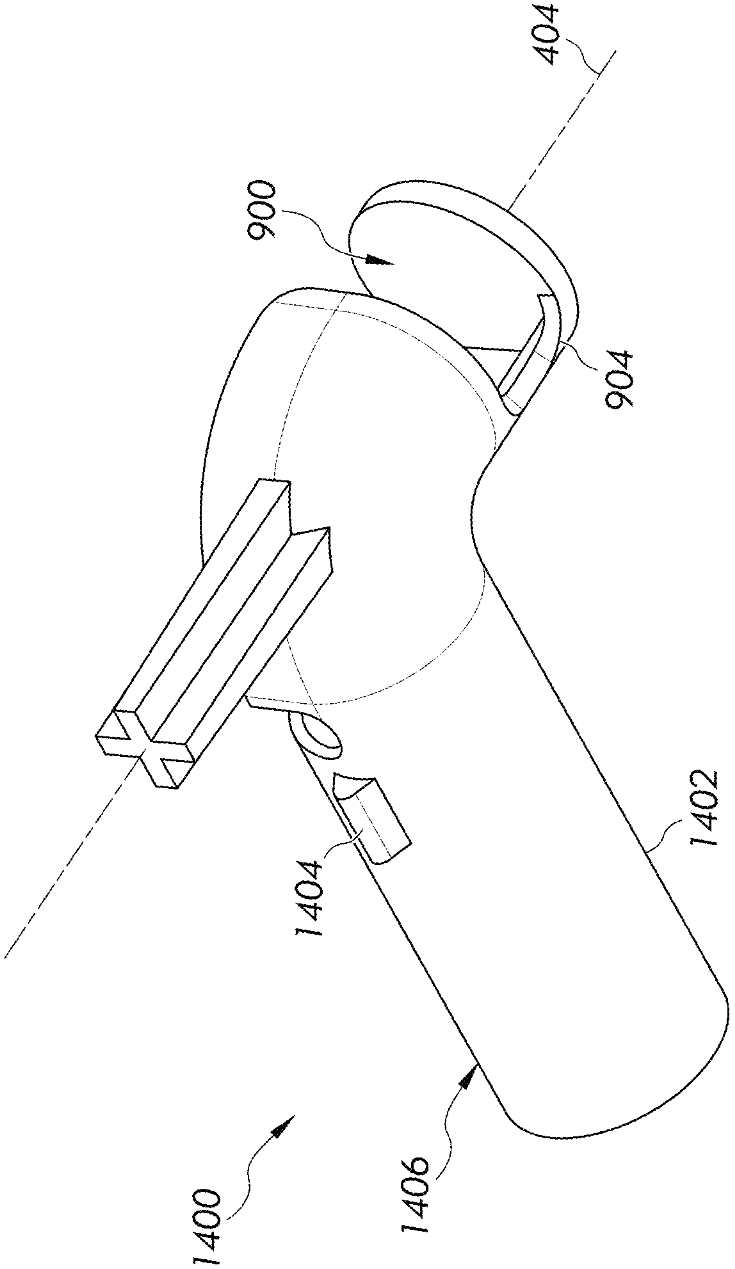
FIG. 16 is a perspective view of the second example curved portion.

Referring to FIGS. 14, 15, and 16, a second example curved portion 1400 is illustrated. This second example curved portion 1400 of the wand 106 includes a hollow cylindrical portion 1402 that connects to the duct 304 of the straight portion 700 of the wand 106. The second example includes the first sidewall 904 and the first channel 900 passing through the first sidewall 904. However, this second example curved portion 1400 does not require the second sidewall 906 and the second channel 902. As the wand 106 rotates, the second conduit 302 can pass out of the first channel 900 and then is not received within a second channel as with the curved portion 702.

The second example curved portion 1400 and other example curved portions can include a protrusion 1404 extending from an outer surface 1406 of the curved portion 1400. The protrusion 1404 interacts or cooperates with another structure described below. In other respects, the second example curved portion 1400 is similar to the curved portion 702 and the similar features are not further described.

Figure 17:
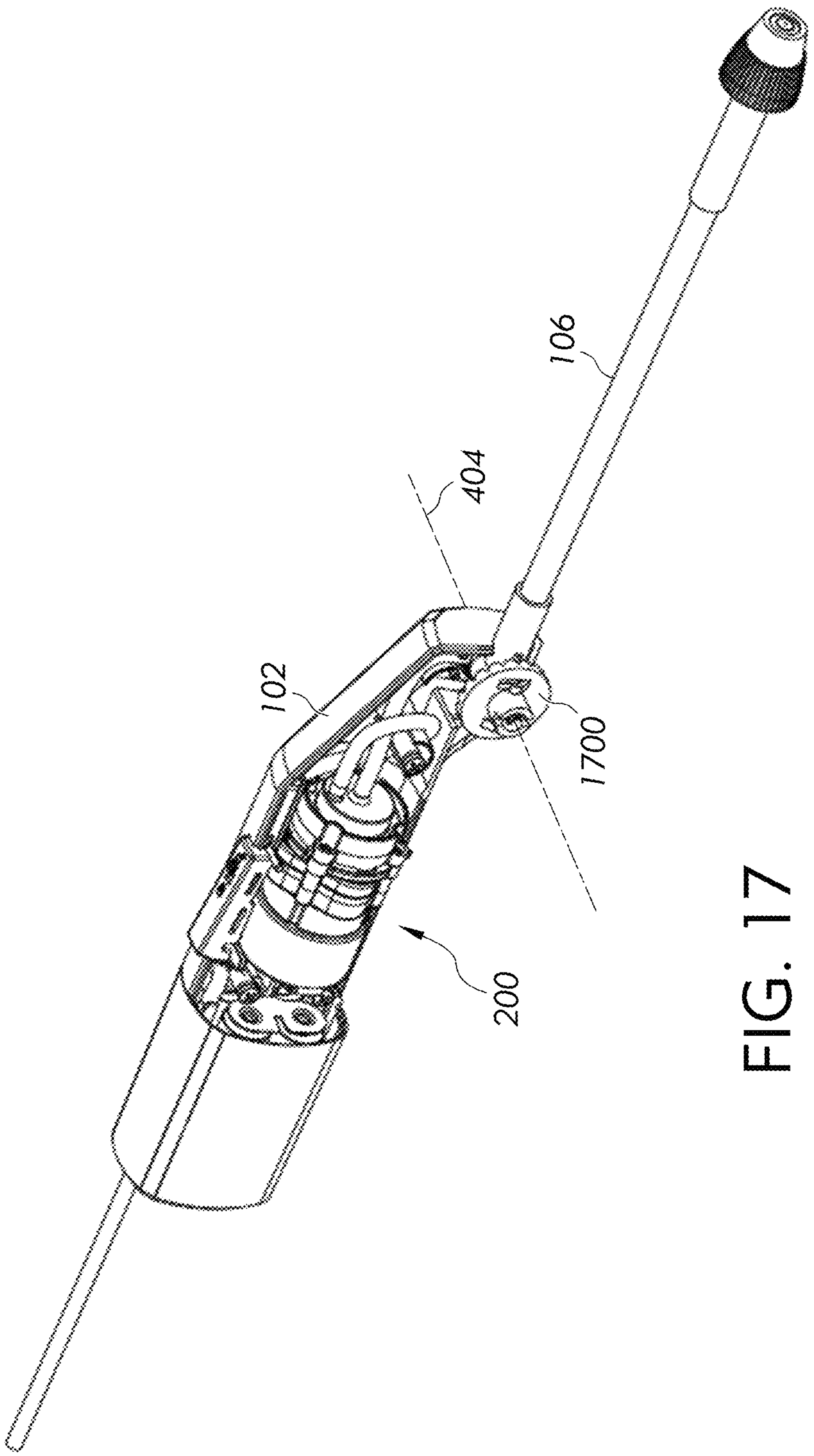
FIG. 17 is a perspective view of the applicator with a first portion of the housing removed.

Referring to FIG. 17, a perspective view of the applicator 100 with the first portion 202 of the housing 102 removed is illustrated. In some examples, the applicator 100 includes a detent wheel 1800. The detent wheel 1800 can be located within the hollow interior 200 of the housing 102, and the detent wheel 1800 is stationary with respect to the wand 106. The detent wheel 1800 cooperates with the protrusion 1404 extending from the outer surface 1406 of the wand 106 to arrest a rotational motion of the wand 106 about the fold axis 404. In some examples, the detent wheel 1800 is located adjacent to or at least partially within the hinge structure 400 as shown in FIG. 4.

Figure 19:
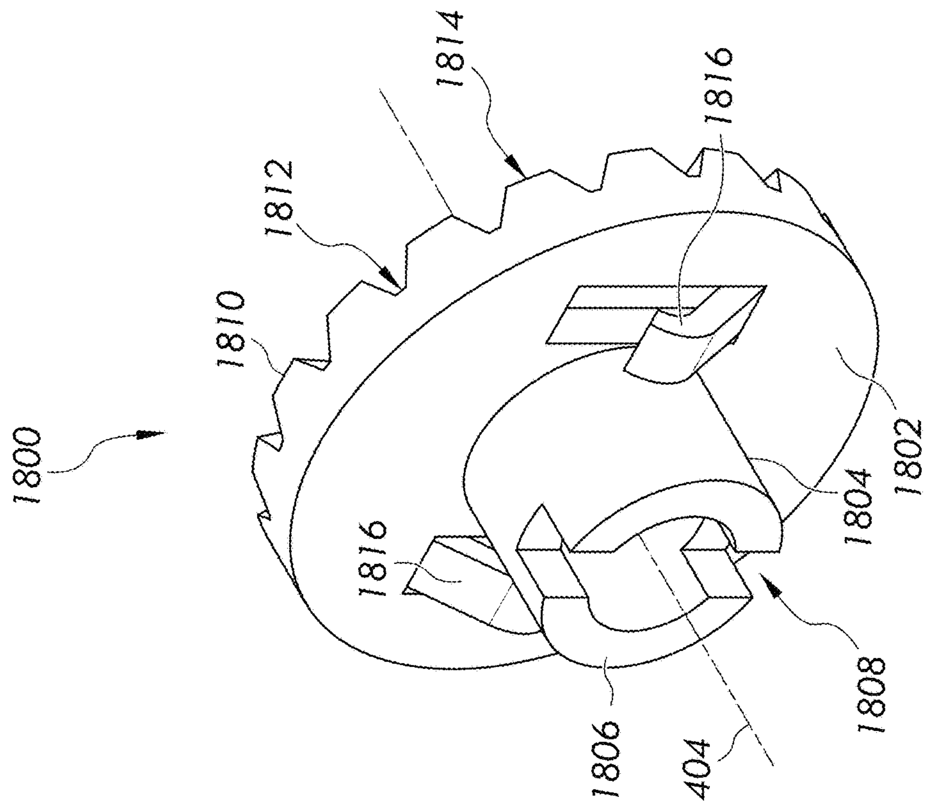
FIG. 19 is a second perspective detail view of the example detent wheel.
Figure 18:
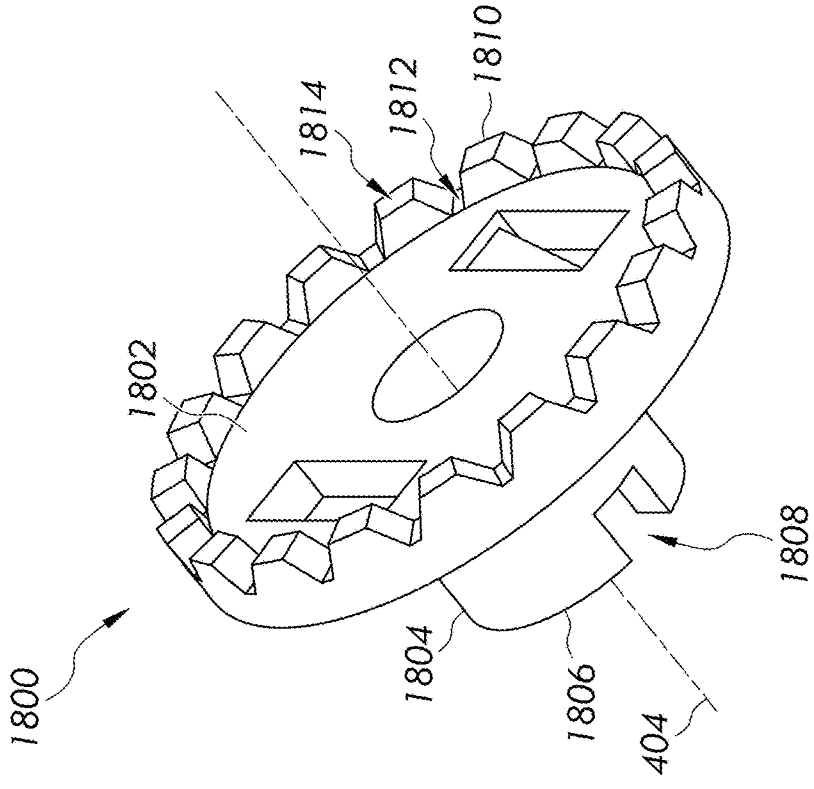
FIG. 18 is a perspective detail view of an example detent wheel.

Referring to FIGS. 18 and 19, perspective detail views of the detent wheel 1800 are illustrated. The detent wheel 1800 includes a generally disc-shaped portion 1802. The detent wheel 1800 can also include a cylindrical structure 1804 extending away from the disc-shaped portion 1802 along the fold axis 404. A top surface 1806 of the cylindrical structure 1804 can define an indentation 1808 that cooperates with a structure (not shown) on at least one of the housing 102 or the hinge structure 400 to prevent rotation of the detent wheel 1800 relative to the housing 102. This also prevents rotation of the detent wheel 1800 relative to the wand 106.

The detent wheel 1800 further includes a set of teeth 1810 located radially around an edge of the disc-shaped portion 1802. The teeth 1810 extend away from the disc-shaped portion 1802 and generally toward the wand 106. The arrangement of the teeth 1810 create alternating inner surfaces 1812 and outer surfaces 1814 that interact or cooperate with the protrusion 1404 of the wand 106.

The applicator 100 further includes a resilient force member to urge the teeth 1810 in a direction toward the protrusion 1404, and into contact with the protrusion 1404. In some examples, the resilient force member is unitary with the detent wheel 1800 as shown by the tabs 1816. The tabs 1816 can be elastically deformed to provide the resilient force to urge the detent wheel 1800 in the direction toward the protrusion 1404. In some examples, the tabs 1816 are in contact with at least one of the hinge structure 400 or the housing 102.

When the wand 106 is in a position (e.g., the first position), the protrusion 1404 is in contact with one of the inner surfaces 1812 of the detent wheel 1800. Rotation of the wand 106 rotates the protrusion 1404 from a position in contact with an inner surface 1812 of the detent wheel 1800 to a position in contact with an outer surface 1814 of the detent wheel 1800. When the protrusion 1404 is in contact with the outer surface 1814 of the detent wheel 1800, the detent wheel 1800 is urged in a direction away from the protrusion 1404.

As described, the force of the resilient force member (e.g., tabs 1816) arrests the rotational motion of the wand 106 until the force of the resilient force member is overcome by the protrusion 1404 moving from the position in contact with the inner surface 1812 of the detent wheel 1800 to the position in contact with the outer surface 1814 of the detent wheel 1800. As such, each of the teeth positions can represent a fixed position of the wand 106 that can be held in that position until the user applies enough rotational force to the wand 106 in order to overcome the force of the resilient force member. It is also contemplated that structures limiting rotational movement of the wand 106 can include an infinite number of positions between the first position and the second position.

Figure 20:
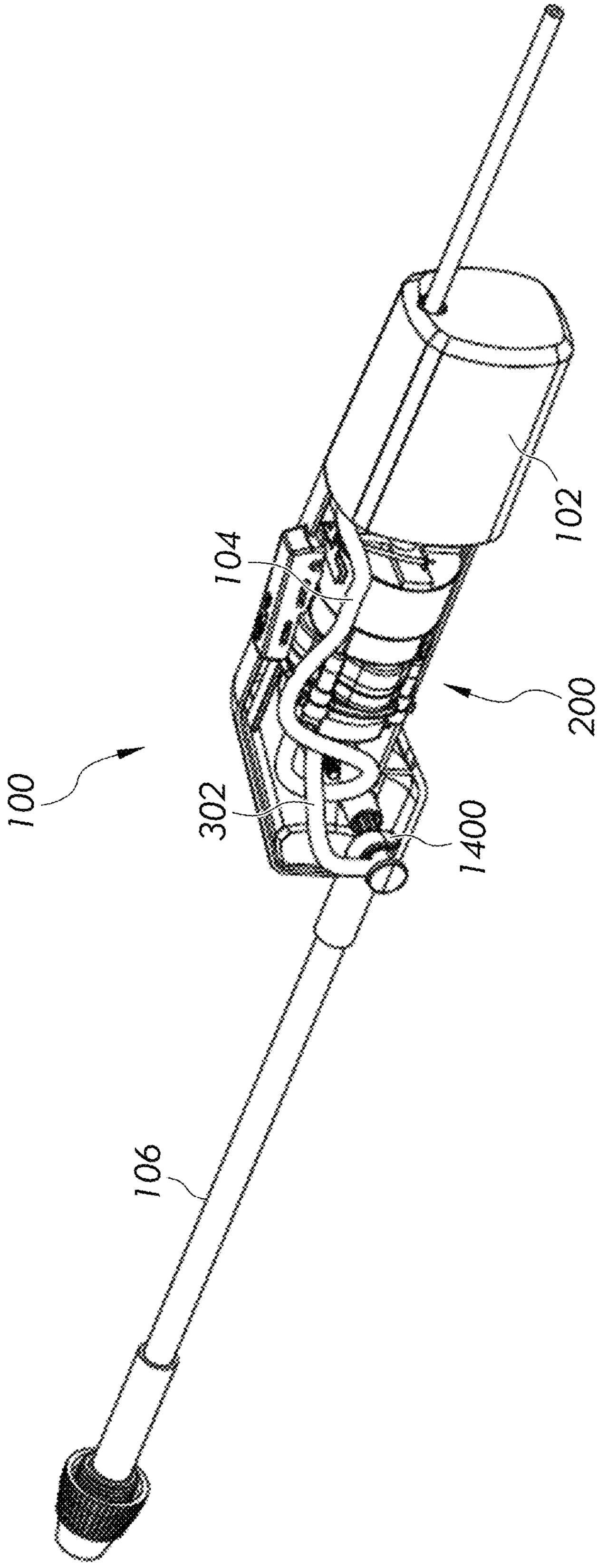
FIG. 20 is a perspective view of the applicator with a second portion of the housing removed.

Referring to FIG. 20, a perspective view of the applicator 100 with the second portion 204 of the housing 102 removed is illustrated. FIG. 20 shows the arrangement of the first conduit 104 and the second conduit 302 within the hollow interior 200 of the housing 102. Additionally, the second conduit 302 is shown located within the first channel 900 of the curved portion 1400.

Figure 21:
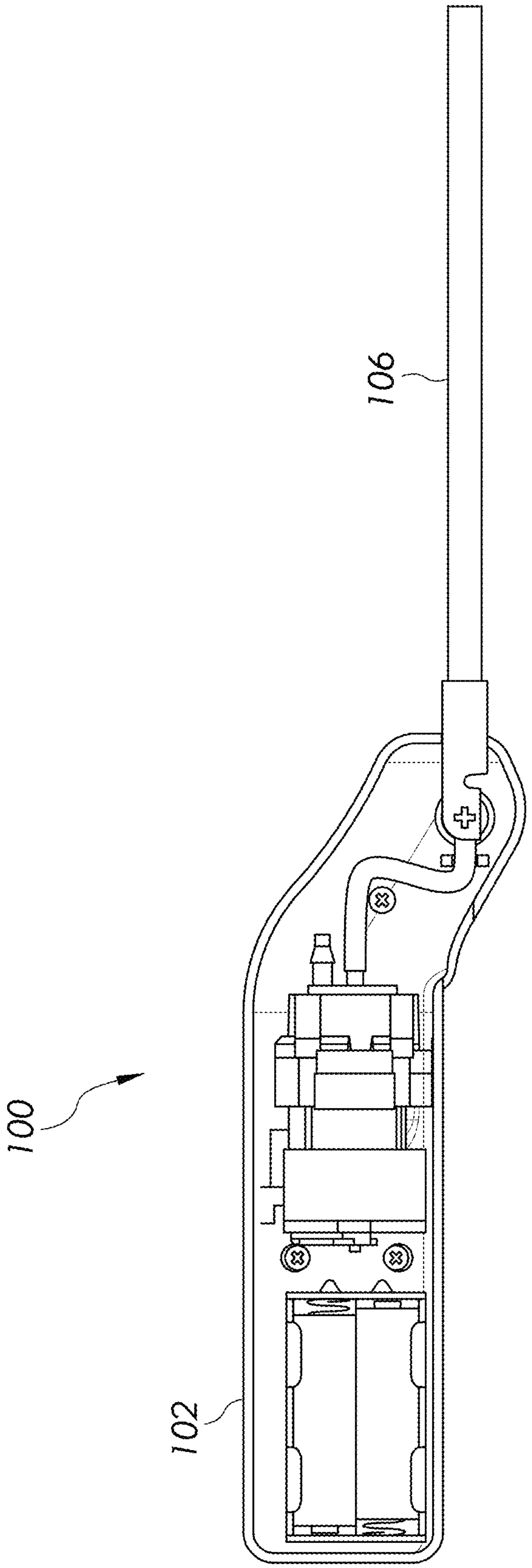
FIG. 21 is a partial cross-section side view of the applicator showing the wand in the second position.

Referring to FIGS. 21, 22, 23, and 24, partial cross-section side views of the applicator 100 are illustrated to demonstrate the first position, second position, and intermediate positions of the wand 106. FIG. 21 shows the wand 106 rotated to the second position relative to the housing 102

Figure 22:
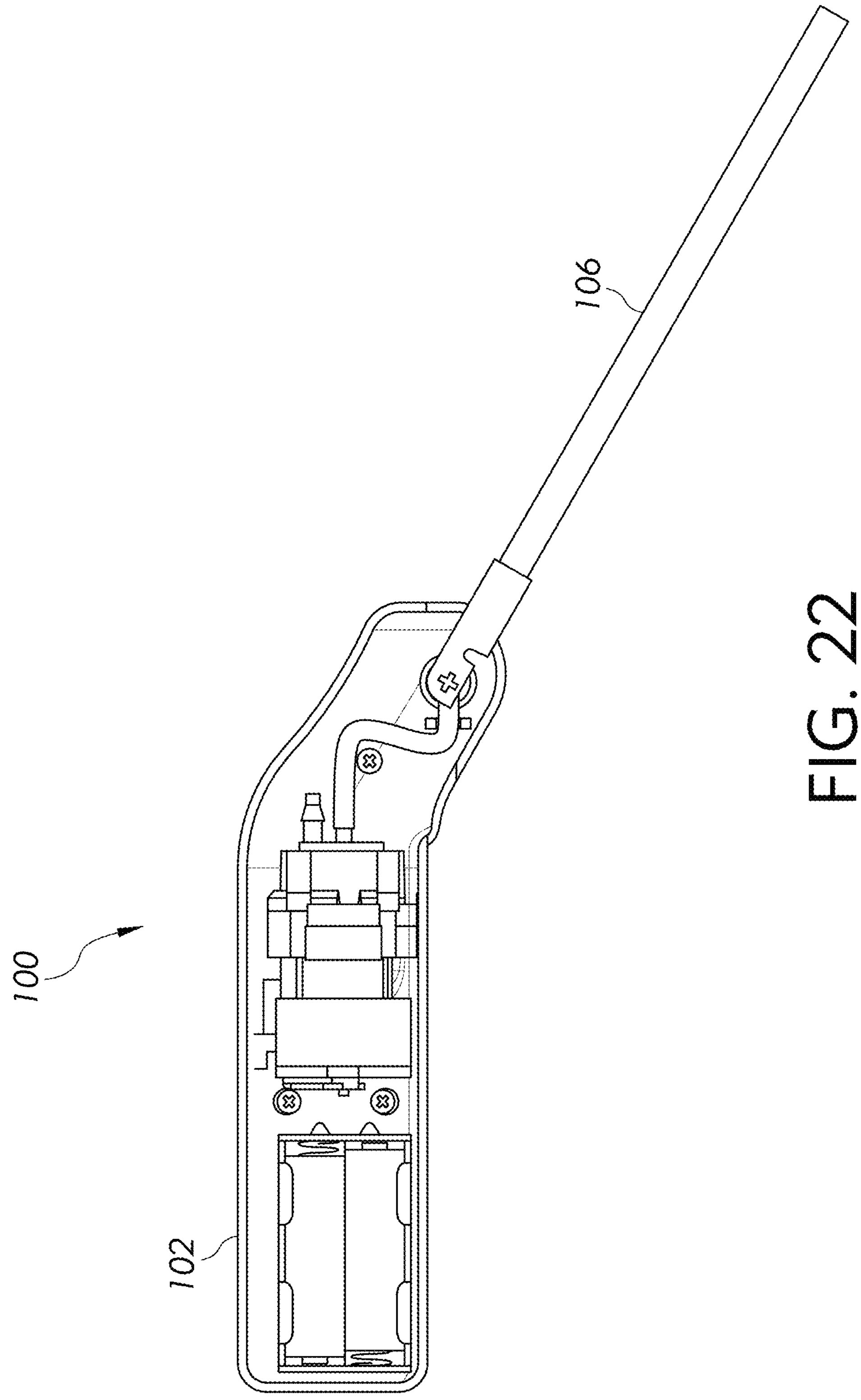
FIG. 22 is a partial cross-section side view of the applicator showing the wand in a first intermediate position.
Figure 23:
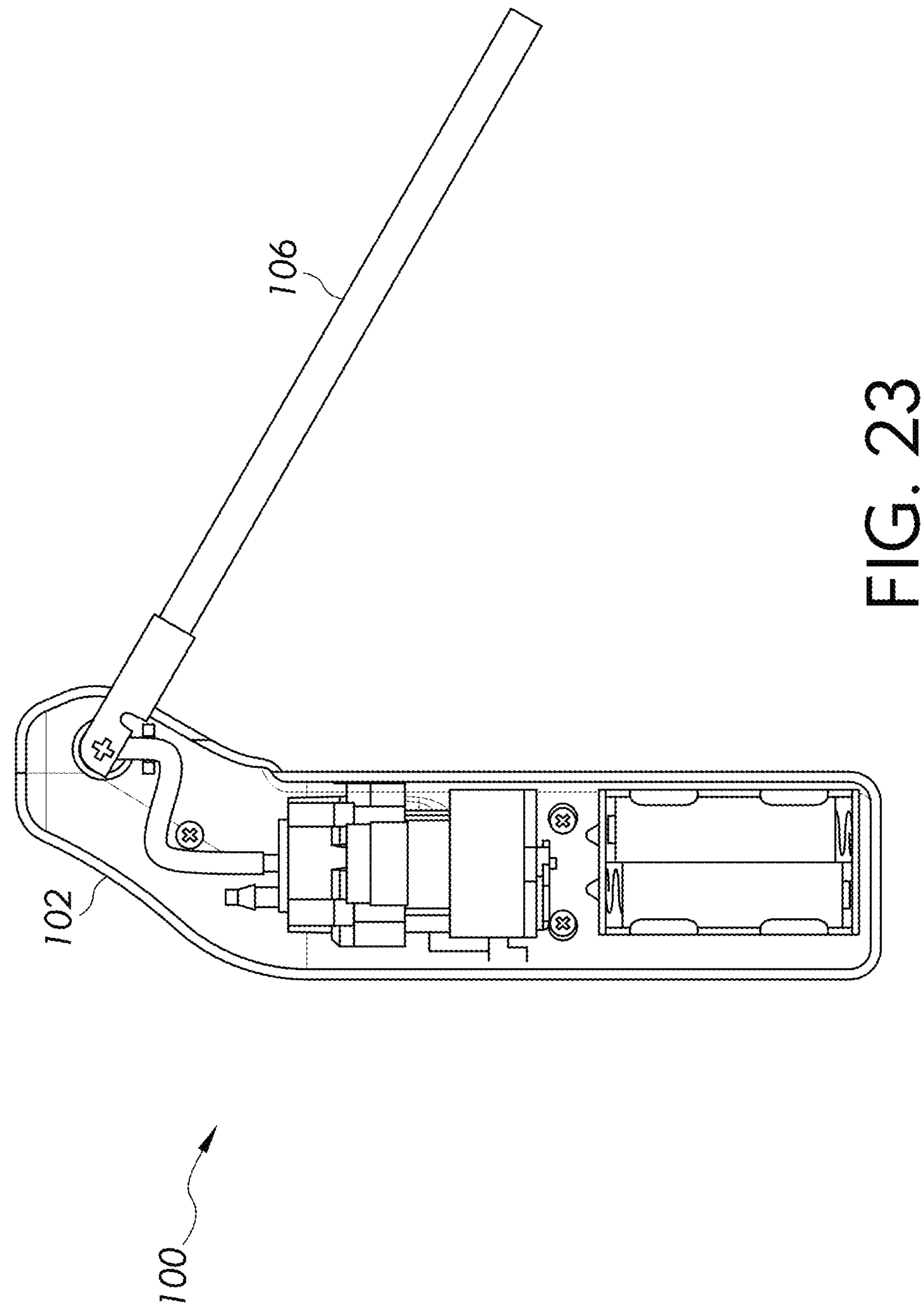
FIG. 23 is a partial cross-section side view of the applicator showing the wand in a second intermediate position.
Figure 24:
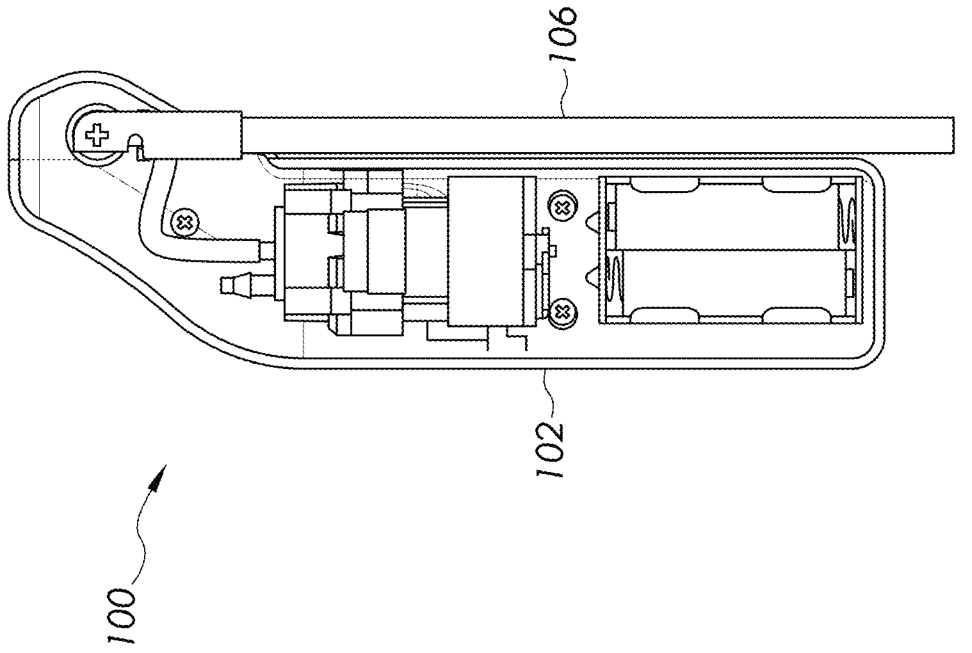
FIG. 24 is a partial cross-section side view of the applicator showing the wand in the first position.

(e.g., in which the wand 106 is fully extended). FIG. 22 illustrates the wand 106 at a first intermediate position that can be rotated about 30° from the second position toward the first position. FIG. 23 shows a second intermediate position that can be rotated about 120° from the second position toward the first position. FIG. 24 shows the wand 106 rotated to the first position relative to the housing 102 (e.g., in which the wand 106 and the housing 102 are folded together).

Several benefits can be derived from the structures and methods described herein. For example, the colinear fold axis and conduit central axis can reduce and or eliminate kinks and undesired bends within the second conduit. Additionally, the design aspect of the presently disclosed device can be simplified by eliminating the requirement for space within the hollow interior of the housing needed to accommodate extra length and changing pathways of the second conduit.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes," "having," "has," "with," and/or variants thereof are used in either the detailed description or the claims, such terms are intended to be inclusive in a manner similar to the term "comprising."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An applicator for dispensing a fluid, comprising:

a housing;

a pump disposed within the housing; and a wand rotatably coupled to the housing, wherein:

- a conduit extends between the pump and the wand to deliver the fluid from the pump to the wand,
- the wand comprises a curved portion for receiving the conduit,
- the conduit, when disposed in the curved portion, intersects an axis about which the wand rotates,
- a first sidewall of the curved portion defines a first channel,
- the conduit is disposed within the first channel when the wand is at a first position relative to the housing,
- a second sidewall of the curved portion defines a second channel,
- the second sidewall is diametrically opposite the first sidewall, and
- the conduit is disposed within the second channel when the wand is at a second position relative to the housing.

2. The applicator of claim 1, comprising:

a nozzle attached to an end of the wand, wherein the conduit extends between the pump and the nozzle to deliver the fluid from the pump to the nozzle at the end of the wand.

3. The applicator of claim 1, wherein the wand is rotatable through an angle of about 180° relative to the housing.

4. An applicator for dispensing a fluid, comprising:

a housing;

a pump disposed within the housing;

a wand rotatably coupled to the housing about a fold axis, wherein:

- a conduit extends along a conduit central axis,
- the conduit extends between the pump and the wand to deliver the fluid from the pump to the wand,
- the wand defines a duct for receiving the conduit, and
- a portion of the conduit central axis is colinear with the fold axis, and a detent wheel, wherein the detent wheel cooperates with a protrusion extending from an outer surface of the wand to arrest a rotational motion of the wand.

5. The applicator of claim 4, comprising a resilient force member that urges the detent wheel in a direction toward the protrusion, wherein:

rotation of the wand rotates the protrusion from a position in contact with an inner surface of the detent wheel to a position in contact with an outer surface of the detent wheel, and when the protrusion is in contact with the outer surface of the detent wheel, the detent wheel is urged in a direction away from the protrusion.

6. The applicator of claim 5, wherein when the wand is urged from a first position to a second position, a force of the resilient force member arrests the rotational motion of the wand until the force of the resilient force member is overcome by the protrusion moving from the position in contact with the inner surface of the detent wheel to the position in contact with the outer surface of the detent wheel.

7. The applicator of claim 5, wherein the resilient force member is unitary with the detent wheel.

8. The applicator of claim 4, comprising:
a nozzle attached to an end of the wand, wherein the conduit extends between the pump and the nozzle to deliver the fluid from the pump to the nozzle at the end of the wand.

9. An applicator for dispensing a fluid, comprising:
a housing;
a pump disposed within the housing;
a wand rotatably coupled to the housing, the wand defining a duct and the wand comprising:
a curved portion at an end of the wand;
a conduit extending between the pump and the wand to deliver the fluid from the pump to the wand, the conduit comprising:
a first portion disposed in the housing,
a second portion disposed in the curved portion, and
a third portion disposed in the duct, wherein:
the wand is rotatable from a first position relative to the housing to a second position relative to the housing,
when in the first position, a conduit path of the conduit from the first portion to the third portion has a first length,
when in the second position, the conduit path from the first portion to the third portion has a second length, and
the first length is equal to the second length, and
a first bracket cooperating with the conduit, wherein:
the wand is rotatable about a fold axis,
the first bracket provides a physical interference to inhibit the first portion from rotating about the fold axis, and
the first bracket comprises two posts extending from an interior surface of the housing and the first portion is located between the two posts.

10. The applicator of claim 9, wherein the second portion is located between the first portion and the third portion.

11. The applicator of claim 9, wherein:
the conduit extends along a conduit central axis, and
the conduit central axis, at the second portion, is colinear with the fold axis such that the conduit rotates about the conduit central axis when the wand is moved from the first position to the second position.

12. The applicator of claim 9, comprising:
a nozzle attached to an end of the wand, wherein the conduit extends between the pump and the nozzle to deliver the fluid from the pump to the nozzle at the end of the wand.

13. The applicator of claim 9, wherein the wand is rotatable through an angle of about 180° relative to the housing.

14. An applicator for dispensing a fluid, comprising:
a housing;
a pump disposed within the housing;
a wand rotatably coupled to the housing, the wand defining a duct and the wand comprising:
a curved portion at an end of the wand;
a conduit extending between the pump and the wand to deliver the fluid from the pump to the wand, the conduit comprising:
a first portion disposed in the housing,
a second portion disposed in the curved portion, and
a third portion disposed in the duct, wherein:
the wand is rotatable about a fold axis from a first position relative to the housing to a second position relative to the housing,
when in the first position, a conduit path of the conduit from the first portion to the third portion has a first length,
when in the second position, the conduit path from the first portion to the third portion has a second length, and
the first length is equal to the second length,
a first bracket cooperating with the conduit to provide a physical interference to inhibit the first portion from rotating about the fold axis; and
a second bracket cooperating with the conduit to provide a second physical interference spaced a distance from the first bracket to inhibit the first portion from rotating about the fold axis about which the wand rotates relative to the housing.

15. The applicator of claim 14, wherein the second bracket is a groove located in a cooperating structure of the housing.

16. The applicator of claim 14, wherein the fold axis is colinear with a conduit central axis of the conduit.

17. The applicator of claim 14, wherein the wand is rotatable through an angle of about 180° relative to the housing.

18. An applicator for dispensing a fluid, comprising:
a housing;
a pump disposed within the housing;
a wand rotatably coupled to the housing, the wand defining a duct and the wand comprising:
a curved portion at an end of the wand;
an appendage attached to the curved portion and extending away from the curved portion along a rotational axis about which the wand rotates relative to the housing, wherein an outer surface of the appendage is configured to cooperate in sliding rotation with another structure; and
a conduit extending between the pump and the wand to deliver the fluid from the pump to the wand, the conduit comprising:
a first portion disposed in the housing,
a second portion disposed in the curved portion, and
a third portion disposed in the duct, wherein:
the wand is rotatable from a first position relative to the housing to a second position relative to the housing,
when in the first position, a conduit path of the conduit from the first portion to the third portion has a first length,
when in the second position, the conduit path from the first portion to the third portion has a second length, and
the first length is equal to the second length.

19. The applicator of claim 18, wherein as the wand is rotated, the second portion of the conduit is configured to rotate about a conduit central axis that is colinear with a fold axis resulting in a twisting action of the second portion that does not increase a length of the conduit path along the second portion.

20. The applicator of claim 18, wherein the wand is rotatable through an angle of about 180° relative to the housing.

* * * * *